(12) United States Patent
Itagaki et al.

(10) Patent No.: US 6,714,687 B2
(45) Date of Patent: Mar. 30, 2004

(54) IMAGE ENCODING/DECODING METHOD, APPARATUS THEREOF AND RECORDING MEDIUM IN WHICH PROGRAM THEREFOR IS RECORDED

(75) Inventors: Fumihiko Itagaki, Hokkaido (JP); Miyuki Kawashima, Hokkaido (JP)

(73) Assignee: Hudson Soft Co., Ltd., Hokkaido (JP)

( * ) Notice: Subject to any disclaimer, the term of this patent is extended or adjusted under 35 U.S.C. 154(b) by 563 days.

(21) Appl. No.: 09/731,484

(22) Filed: Dec. 8, 2000

(65) Prior Publication Data

US 2001/0051005 A1 Dec. 13, 2001

(30) Foreign Application Priority Data

May 15, 2000 (JP) ........................ 2000-141675

(51) Int. Cl.[7] .................................. G06K 9/36

(52) U.S. Cl. .................... 382/251; 382/250

(58) Field of Search ............... 382/232–253; 375/240–241

(56) References Cited

U.S. PATENT DOCUMENTS

| 5,757,969 A | * | 5/1998 | Kim ........................... 382/236 |
| 5,852,682 A | * | 12/1998 | Kim ........................... 382/233 |
| 5,937,098 A | * | 8/1999 | Abe ........................... 382/239 |
| 6,477,276 B1 | * | 11/2002 | Inoue et al. ................. 382/251 |

FOREIGN PATENT DOCUMENTS

| EP | 1104199 | 5/2001 |
| WO | WO 00/02393 | 1/2000 |

OTHER PUBLICATIONS

Patent Abstracts of Japan, Publ. No.: 07038760, Publ. Date: Feb. 7, 1995.
You H, et al., "Improving LIFS Image Coding Scheme Via Gram–Schmidt Orthogonalization", IEICE Technical Report, 1998, pp. 37–42.
Takahashi T, et al., "A Fast Computation Algorithm for Predicting AC Components of Imagesusing Mean Values of Blocks", vol. J81–D–II, No. 4, Apr. 1998, pp. 778–780.
Huang S–C, et al., "A Contrained Vector Quantization Scheme for Real–Time Codebook Retransmission", vol. 4, No. 1, Feb. 1, 1994, pp. 1–7.

* cited by examiner

*Primary Examiner*—Jingge Wu
(74) *Attorney, Agent, or Firm*—Antonelli, Terry, Stout & Kraus, LLP

(57) ABSTRACT

The invention relates to an image encoding/decoding method, apparatus thereof and a recording medium in which a program therefor is recorded, whereby the encoding/decoding can be obtained with high image quality at high speed. In an image encoding method which comprises producing a DC image composed of each block mean value by dividing an image data per B pixel into a block, making a part of said DC image a DC nest, and where the differential vector $<d_j>$ which is obtained by separating the DC value $DC_J$ from the pixel block $<R_j>$ to be encoded is over an allowable value Z, calculating one or more orthogonal basis $(\alpha_k<V_k>)$, to which the differential vector is approximated, by the adaptive orthogonal transform (AOT) using the DC nest, each of the lowest n ($n=\log_2 B$) bits of base extraction blocks $<U_i>$ which are down-sampled from the DC nest is set to 0. Further, base extraction vectors $<u_i>$ are produced by separating a block mean value $a_i$ from the base extraction blocks $<U_i>$.

10 Claims, 16 Drawing Sheets

IMAGE VIEW OF CONVENTIONAL ADAPTIVE ORTHOGONAL TRANSFORM PROCESSING

IMAGE VIEW OF CONVENTIONAL ADAPTIVE ORTHOGONAL TRANSFORM PROCESSING

VIEW FOR EXPLANING PRINCIPLE OF THE INVENTION

FIG. 6 BLOCK DIAGRAM OF IMAGE ENCODING APPARATUS OF THE INVENTION

FLOW CHART(2) OF ADAPTIVE ORTHOGONAL TRANSFORM PROCCESSING IN THE INVENTION

EXPLANATION VIEW (1) OF DC NEST IN THE INVENTION

EXPLANATION VIEW (2) OF DC NEST IN THE INVENTION

DC

| A | B | C | D | SUM | AV |
|---|---|---|---|-----|-----|
| 93 | 35 | 73 | 50 | 251 | 62.75 |
| 0 | 0 | 0 | 0 | 1 | |
| 1 | 0 | 1 | 0 | 1 | |
| 0 | 1 | 0 | 1 | 1 | |
| 1 | 0 | 0 | 1 | 1 | |
| 1 | 0 | 1 | 0 | 1 | |
| 1 | 0 | 0 | 0 | 0 | |
| 0 | 1 | 0 | 1 | 1 | |
| 1 | 1 | 1 | 0 | 1 | |

N

| A | B | C | D | SUM | AV |
|---|---|---|---|-----|-----|
| 80 | 32 | 64 | 48 | 224 | 56 |
| 0 | 0 | 0 | 0 | 1 | |
| 1 | 0 | 1 | 0 | 1 | |
| 0 | 1 | 0 | 1 | 1 | |
| 1 | 0 | 0 | 1 | 0 | |
| 0 | 0 | 0 | 0 | 0 | |
| 0 | 0 | 0 | 0 | 0 | |
| 0 | 0 | 0 | 0 | 0 | |
| 0 | 0 | 0 | 0 | 0 | | u

| a | b | c | d | sum |
|---|---|---|---|-----|
| 24 | -24 | 8 | -8 | 0 |

| A | B | C | D | SUM | AV |
|---|---|---|---|-----|-----|
| 93 | 35 | 73 | 50 | 251 | 62.75 |
| 0 | 0 | 0 | 0 | 1 | |
| 1 | 0 | 1 | 0 | 1 | |
| 0 | 1 | 0 | 1 | 1 | |
| 1 | 0 | 0 | 1 | 1 | |
| 1 | 0 | 1 | 0 | 1 | |
| 1 | 0 | 0 | 0 | 0 | |
| 0 | 1 | 0 | 1 | 1 | |
| 1 | 1 | 1 | 0 | 1 | |

N

| A | B | C | D | SUM | AV |
|---|---|---|---|-----|-----|
| 93 | 35 | 73 | 50 | 240 | 60 |
| 0 | 0 | 0 | 0 | 1 | |
| 1 | 0 | 1 | 0 | 1 | |
| 0 | 1 | 0 | 1 | 1 | |
| 1 | 0 | 0 | 1 | 1 | |
| 1 | 0 | 1 | 0 | 0 | |
| 1 | 0 | 0 | 0 | 0 | |
| 0 | 1 | 0 | 1 | 0 | |
| 1 | 1 | 1 | 0 | 0 | | u

| a | b | c | d | sum |
|---|---|---|---|-----|
| 33 | -25 | 13 | -10 | 11 |

FIG. 12 (b)

IMAGE DRAWING OF EXPANSION COEFFICIENT ENCODING PROCESSING
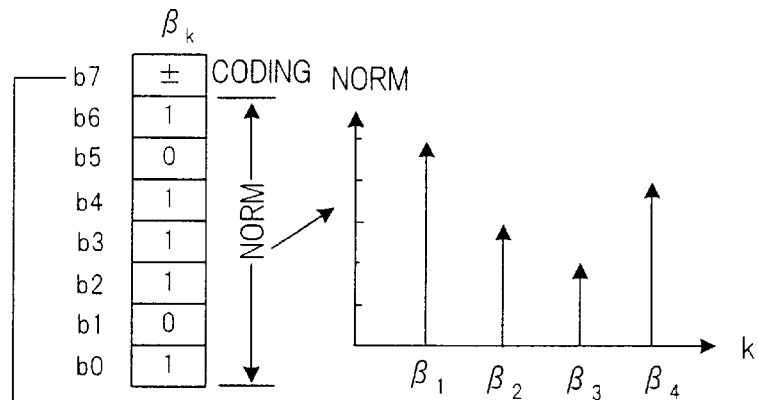
FIG. 13(a)
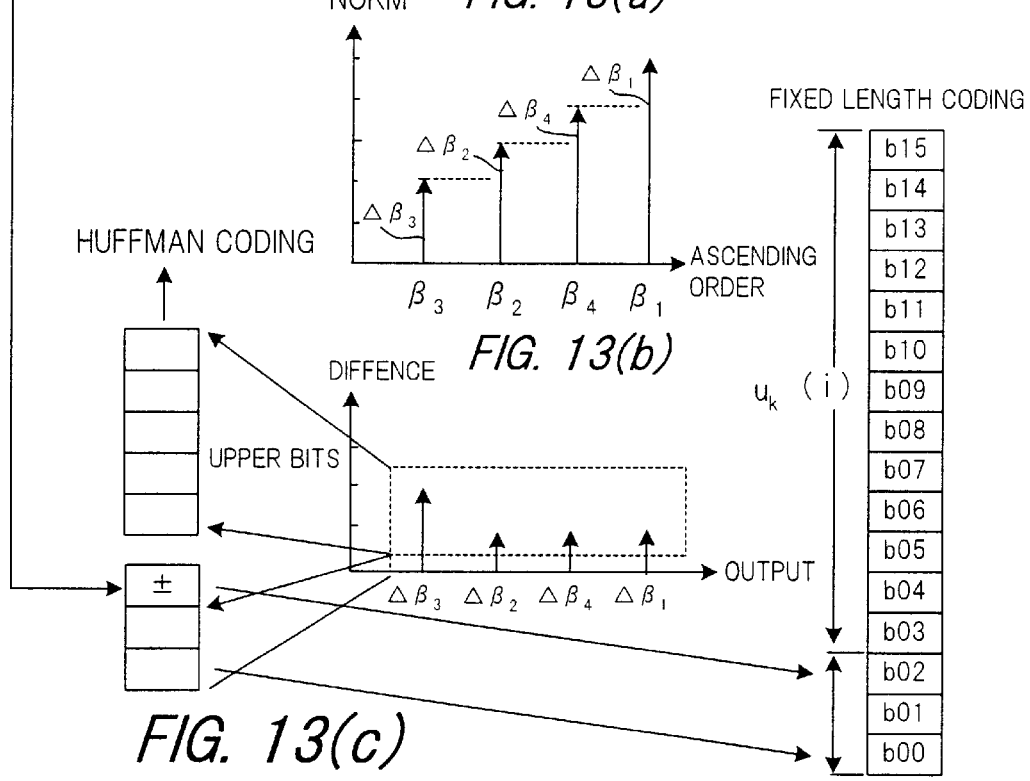
FIG. 13(b)
FIG. 13(c)
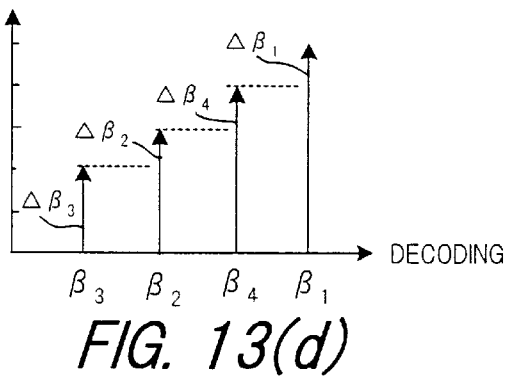
FIG. 13(d)

IMAGE VIEW OF ALTERNATING CURRENT COMPONENT PREDICTION IN THE INVENTION

IMAGE ENCODING/DECODING METHOD, APPARATUS THEREOF AND RECORDING MEDIUM IN WHICH PROGRAM THEREFOR IS RECORDED

BACKGROUND OF THE INVENTION

1. Field of the Invention

The present invention relates to an image encoding/decoding method, an apparatus thereof, and a recording medium in which a program therefor is recorded, and more particularly, relates to an image encoding/decoding method, an apparatus thereof, and a recording medium in which a program therefor is recorded, according to Hybrid Vector Quantization (HVQ) system.

2. Description of Related Art

According to JPEG (Joint Photographic Expert Group) system, 8 times 8 pixel blocks are converted to DC (direct current) value and each coefficient value of from base to 63 times frequency by two dimensional DCT (discrete cosine transform), and information amount is reduced by quantizing the coefficient value in a different quantization width within no reduction of image quality utilizing frequency components of natural images which are gathered in a low frequency range, and then Huffman encoding is carried out.

According to HVQ system, which is a kind of mean value separation type block encoding same as JPEG, adaptive orthogonal transform (AOT) which is an intermediate system between a vector quantization and orthogonal transform encoding is used as a compression principle. AOT is a system in which the minimum number of non-orthogonal basis is selected from nests of the basis corresponding to a code book of vector quantization and the objective blocks become close to the desired and allowable error "Z". According to the HVQ system, decoding is quickly carried because a decoding operation can be done in the form of integer. Natural images and artificial images (animation images, CG images) can be compressed in high image quality, because there are not mosquito and block noise, which are particularly generated in JPEG, and false contour, which is particularly generated in GIF. The invention relates to a method for further improving the image quality and for carrying out the coding operation at a higher speed in the HVQ system.

The applicants of the invention have proposed an image encoding/decoding method in accordance with the HVQ system utilizing self-similarity of images in Japanese Patent Application No. 189239/98. The contents of such proposal will be explained as follows. In the disclosure, a sign <a> means vector "a" or block "a", a sign $\|a\|$ means norm of the vector "a", and a sign <a·b> means inner product of vectors a and b. Further, vectors and blocks in drawings and [numbers] are represented by block letters.

FIG. 1 is a block diagram showing a conventional image encoder. In FIG. 1, 11 is an original image memory for storing an original image data, 12 is a DC value production unit for seeking a block average (DC) value per each pixel block (4 times 4 pixel) of the original image data, 13 is a differential PCM encoding unit (DPCM) for carrying out a differential predict encoding per each DC value, 14 is inverse DPCM encoding unit for decoding each DC value from the differential PCM encoding, 15 is a DC image memory for storing a decoded DC image, 16 is a DC nest production unit for cutting off the DC nest of a desired size from a part of the DC image, and 17 is a DC nest memory for storing the DC nest.

Further, 18 is a subtractor for separating a corresponding decoding DC value "$DC_J$" from a target image block <$R_J$> to be encoded, 19 is a differential vector buffer for storing a differential vector <$d_J$> which is DC separated, 20 is an extracted block buffer for storing a base extraction block <$U_i$> of 4 times 4 pixels which is down-sampled from the DC nest, 21 is an equilibrator for seeking a block mean value $a_i$ of the base extraction block <$U_i$>, 22 is a subtractor for separating the block means value $a_i$ from the base extraction block <$U_i$>, 23 is an extracted vector buffer for storing the base extraction block <$U_i$> which is separated by the mean value, 24 is an adaptive orthogonal transform (AOT) processing unit for producing an orthogonal basis $\alpha_k$ <$u_k'$> (k=1~m) to search the DC nest to make the differential vector <$d_J$> closer to the allowable error Z, where a square norm $\|d_J\|^2$ of the differential vector is over the allowable error Z, 25 is a coefficient transform unit for seeking an expanding square coefficient $\beta_k$ which is multiplied by a non-orthogonal basis vector <$u_k$> (k=1~m) per the produced orthogonal basis $\alpha_k$ <$u_k'$> (k=1~m) to produce an equivalent non-orthogonal basis $\beta_k$ <$u_k$> (k=1~m, and 26 is an encoding unit by Huffman coding, run length coding or fixed length coding system for the compression encoding of information such as DPCM encoding of the DC value or the non-orthogonal basis $\beta_k$ <$u_k$>.

In the DC value production unit 12, the block mean value of 4 times 4 pixels is provided in which the first decimal place is rounded off or down. In the DPCM 13, where the DC value of row J and column T is shown by the $DC_{J, I}$, a predictive value $DC_{J, I}'$ of the $DC_{J,I}$ is provided by the formula, $DC_{J, I}'=(DC_{J, I-1}+DC_{J-1, I})/2$, and its predictive error ($\Delta DC_{J, I}=DC_{J, I}-DC_{J, I}'$) is linear-quantized by a quantization coefficient Q(Z) and is output. The quantization coefficient Q(Z) corresponds to the allowable error Z and is variable within the range of 1 to 8 according to the allowable error Z.

In the DC nest production unit 16, the DC nest is prepared by copying the range of vertical 39×horizontal 71 from the DC image. It is preferred that the DC nest includes more alternating current components because it is used as a codebook. Therefore, it is prepared by copying such the range that the sum of absolute values of difference between the DC values adjacent to each other in a plurality of the extracted ranges become maximum.

In making down-samples of the base extraction block <$U_i$>, a vertex per one DC value in vertical and horizontal section is set to ($p_x$, $p_y$) ∈ [0, 63]×[0, 31] and a distance of its sub-samples is set to 4 kinds of ($s_x$, $s_y$) ∈ {(1, 1), (1, 2), (2, 1), (2, 2) }. Accordingly, the total numbers of the base extraction blocks <$U_i$> are N (=8192) and are referred by an index counter "i" from the AOT 24. Behavior of conventional adaptive orthogonal transform processing unit 24 will be explained below.

FIG. 2 is a flow chart of conventional adaptive orthogonal transform processing and FIG. 3 is an image drawing of the processing. In FIG. 2, it is input in the processing that the square norm $\|d_J\|^2$ of the differential vector is more than Z. In step S121, the square norm $\|d_J\|^2$ of the differential vector is set in a resister E. A basis number counter is initialized to k=1. In step S122, much value ( e.g. 100,000) is set in a minimum value holding resister E'. In step S123, an index counter of the base extraction block <$U_i$> is initialized to i=0. By these steps, the initial address and distance of sub-samples in the DC nest are set to ($p_x$, $p_y$)=(0, 0) and ($s_x$, $s_y$)=(1, 1), respectively.

In step S124, the base extraction vector <$u_i$> is produced by separating the block mean value $a_i$ from the base extraction blocks $<U_i>$. Since the operation or calculation is carried out under the accuracy of integer level, any value of first decimal place in the block mean value $a_i$ is rounded off or down. In step S125, the base extraction vector $<u_i>$ is subjected to orthogonal transform processing to be converted to the orthogonal basis vector $<u_k'>$, if necessary (k>1).

FIG. 3 (A) and (B) are image drawings of the orthogonal transform processing. In FIG. 3 (A), the first base extraction vector $<u_1>$ can be the first basis vector $<u_1'>$ as it is.

Then, the second base extraction vector $<u_2>$ is subjected to orthogonal transform processing to be converted to the second basis vector $<u_2'>$ in accordance with the following method. That is, a shadow of the second base extraction vector $<u_2>$ projected on the first basis vector $<u_1'>$ is represented by the formula (1).

[Numeral 1]

$$\|u_2\|\cos\theta = \frac{\langle u_1' \cdot u_2\rangle}{\|u_1'\|} \quad \because \langle u_1' \cdot u_2\rangle = \|u_1'\|\|u_2\|\cos\theta \tag{1}$$

Accordingly, the second orthogonal vector $<u_2'>$ is obtained by subtracting the vector of the projected shadow from the second base extraction vector $<u_2>$.

[Numeral 2]

$$u_2' = u_2 - \frac{\langle u_1' \cdot u_2\rangle}{\|u_1'\|}\frac{u_1'}{\|u_1'\|} \tag{2}$$

In FIG. 3(B), the third base extraction vector $<u_3>$ is subjected to orthogonal transform processing to the first basis vector $<u_1'>$ and the second basis vector $<u_2'>$.

FIG. 3 is three-dimensionally drawn. The third base extraction vector $<u_3>$ is subjected to orthogonal transform processing to the first basis vector $<u_1'>$ to obtain an intermediate orthogonal vector $<u_3''>$.

[Numeral 3]

$$u_3'' = u_3 - \frac{\langle u_1' \cdot u_3\rangle}{\|u_1'\|^2}u_1' \tag{3}$$

Further, the intermediate orthogonal vector $<u_3''>$ is subjected to orthogonal transform processing to the second basis vector $<u_2'>$ to obtain the third basis vector $<u_3'>$.

[Numeral 4]

$$u_3' = u_3'' - \frac{\langle u_2' \cdot u_3''\rangle}{\|u_2'\|^2}u_2' \tag{4}$$

$$= \left(u_3 - \frac{\langle u_1' \cdot u_3\rangle}{\|u_1'\|^2}u_1'\right) - \frac{\left\langle\left(u_3 - \frac{\langle u_1' \cdot u_3\rangle}{\|u_1'\|^2}u_1'\right) \cdot u_2'\right\rangle}{\|u_2'\|^2}u_2'$$

$$= u_1 - \frac{\langle u_1' \cdot u_3\rangle}{\|u_1'\|^2}u_1' - \frac{\langle u_2' \cdot u_3\rangle}{\|u_2'\|^2}u_2'$$

Turning to FIG. 2, in step S126, a scalar coefficient $\alpha_i$ is calculated using the orthogonal vector $<u_i'>$ so that a distance with the differential vector $<d_k>$ (at first $<d_j>$) becomes minimum.

FIG. 3(C) is an image drawing of the orthogonal transform processing. In FIG. 3(C), where a differential vector represented by $<d_k>$ is subjected to approximation, a square norm thereof ($e_i = \|<d_k> - \alpha_i<u_i'>\|^2$) is minimum when the product of the orthogonal vector $<u_i'>$ and the scalar coefficient $\alpha_i$ is diagonal with the differential vector $\{<d_k> - \alpha_i <u_i'>\}$ as shown in FIG. 3(C) (inner product=0). Accordingly, the scalar coefficient $\alpha_i$ is obtained by the formula (5).

[Numeral 5]

$$\langle \alpha_i u_i' \cdot (d_k - \alpha_i u_1')\rangle = 0 \tag{5-1}$$

$$\alpha_i\langle u_i' \cdot d_k\rangle - \alpha_i^2\langle u_i' \cdot u_i'\rangle = 0$$

$$\alpha_i = \frac{\langle d_k \cdot u_i'\rangle}{\|u_i'\|^2} \tag{5-2}$$

It is shown in the drawing that the differential vector $<d_k>$ (k=0) is subjected to approximation to other first base extraction vector $<u_j'>$. The first base extraction vector $<u_j'>$ is shown by the image drawing because it can take optional directions.

Turning to FIG. 2, in step S127, a square norm ($e_i$) of error vector is obtained by the formula (6) after the differential vector $<d_k>$(k=0) is subjected to approximation to the base extraction vector $\alpha_i<u_j'>$.

[Numeral 6]

$$e_i = \|d_k - \alpha_i u_i'\|^2 \tag{4}$$

$$= \|d_k\|^2 - 2\alpha_i\langle d_k \cdot u_i'\rangle + \alpha_i^2\|u_i'\|^2$$

$$= \|d_k\|^2 - 2\frac{\langle d_k \cdot u_i'\rangle^2}{\|u_i'\|^2} + \frac{\langle d_k \cdot u_i'\rangle^2}{\|u_i'\|^4}\|u_i'\|^2$$

$$= \|d_k\|^2 - \frac{\langle d_k \cdot u_i'\rangle^2}{\|u_i'\|^2}$$

$$= E - \frac{\langle d_k \cdot u_i'\rangle^2}{\|u_i'\|^2}$$

In step S128 of FIG. 2, it is judged whether $e_i$ is less than E' or not. If $e_i$ is less than E', content of E' is renewal in step S129 and the information regarding $\alpha_i$, $<u_i'>$, $<u_i>$, etc. at the time is held in an arrangement $[\alpha_k]$, $[u_k']$, $[u_k]$, etc. If $e_i$ is not less than E', the processing in step S129 is skipped.

In step S130, one (1) is added to the counter i, and in step S131, it is judged whether i is not less than N (=8192) or not. If i is less than N. turning to step 124 and the same processing is carried out with respect to next base extraction vector $<u_i>$.

The processing is repeated and when it is judged in step S131 that i is not less than N, all base extraction vectors $<u_i>$ have been completely tried. At the time, the register E' holds the minimum square norm $e_i$.

It is judged in step S132 whether E' is not more than Z or not. If E' is more than Z, it is treated as E=E' in step S133. That is, the square norm of the differential vector is renewal. In step S134, one (1) is added to the counter k, turning to step S122. If E' is not more than Z, this processing is skipped. Thus, the orthogonal basis $\alpha_k<u_k'>$(k=1~m) to approximate the difference of the first differential vector $<d_j>$ to the allowable error Z is obtained.

However, the block mean value $a_i$ of the base extraction block $<U_i>$ has been rounded off or down in the conventional methods and therefore, improvement of image quality is limited. Why the conventional methods are inconvenient will be explained according to FIG. 4.

FIG. 4 is an image drawing of mean value separation processing. A relationship of base extraction block $<U_i>$ (vertical axis) with the pixel value of certain row (horizontal axis) is shown in FIG. 4(a). An actual pixel value is a block mean value of 16 pixels, but the block mean value of 4 pixels will be used to simplify the explanation herein. In FIG.

14(a), each pixel value is 5, 2, 4, and 3 and its mean value $a_i$ is 3.5, when the first decimal place is round down, the block mean value $a_i$ of the base extraction block $<u_i>$ is 0.5 as shown in FIG. 4(b). In FIG. 4(c), if the basis vector $\beta_k$ $<u_k>$ is added to the DC value $DC_J$ of the decoded block, the DC component ($a_i$=0.5) is overlapped on the target block $<R_j>$. In case that the number of basis is plural, the DC value is overlapped on the $DC_J$ by various values in the range of $0<a_i<1$, and as a result, certain noise is overlapped per each block in the decoded image, whereby image quality is not improved. This disadvantage also occurs in case that the first decimal place is rounded off or up.

According to the conventional AOT processing, much operations and much time are required, because all of the base extraction vectors $<u_i>$ must be subjected to orthogonal processing to the preceding base vectors $<u_k'>$.

SUMMARY OF THE INVENTION

It is therefore an object of the invention to provide an image encoding/decoding method, which provides high image quality at high speed, an apparatus thereof and a recording medium in which such program therefor is recorded.

The above object of the invention can be solved by the construction, for example, as shown in FIG. 5. That is, the image encoding method of the invention (1) comprises producing a DC image composed of each block mean value by dividing an image data per B pixel into a block, making a part of said DC image a DC nest, and where the differential vector $<d_j>$ which is obtained by separating the DC value $DC_J$ from the pixel block to be encoded is over an allowable value Z, calculating one or more orthogonal basis (e.g. $\alpha_k<v_k>$), to which the differential vector $<d_j>$ is approximated, by the adaptive orthogonal transform (AOT) using the DC nest, wherein the lowest n ($n=\log_2 B$) bits of the DC pixel in each sample being set to 0, where the base extraction block is down-sampled from the DC nest and the block mean value $a_i$ of it is calculated using the samples.

Accordingly, any fraction less than 1 does not occurs in the block mean value $a_i$ and the block mean value $a_i$ with integer level precision is obtained at high speed.

In a preferred embodiment of the invention (1) that is the invention (2), the lowest n bits of the DC pixel is set to 0 or is masked, where the DC nest is produced from the DC image.

Accordingly, the DC nest, of which the lowest n bits of the DC pixel is set to 0 or is masked, is efficiently obtained by one processing.

In a preferred embodiment of the invention (1) or (2) that is the invention (3), a base extraction vector $<u_i>$ is produced to which the differential vector $<d_j>$ approximates by separating the block mean value $a_i$ from the base extraction block $<U_i>$ in which the lowest n bits of the DC pixel is set to 0.

According to the invention (3), the sum (the block mean value) of all elements in such base extraction vectors $<u_i>$ is always 0 and the DC component is completely separated. Therefore, even if the base vectors $<u_k>$ are piled up on each other in the decoding side, unnecessary DC component (noise) does not cause. The image quality in the HVQ system is more improved by the invention (3).

In a preferred embodiment of the invention (3) that is the invention (4), optional elements (e.g. $u_{16}$) of base extraction vectors $<u_i>$ are replaced by linear bond of the remainder elements and the inner product of the base extraction vectors $<u_i>$ and the other optional vectors $<w>$ are calculated by the formula, $$<w \cdot u_i> = (w_1-w_{16})u_1+(w_2-w_{16})u_2+ \ldots +(w_{15}-w_{16})u_{15}$$

In the invention (4), the sum of all elements in the base extraction vectors $<u_i>$ is always 0 and hence, the optional elements (e.g. $u_{16}$) are represented by the linear bond of the remainder elements. Accordingly, the inner product calculation $<w \cdot u_i>$ with the other optional vectors (w) can be expanded to the product-sum calculation as shown by the above formula, whereby a single round of such complicated calculation can be omitted. Since much inner product calculation of the vectors is conducted in the image encoding method according to the HVQ system, such single round omission of the calculation contributes to high speed encoding processing.

In a preferred embodiment of the invention (3) or (4) that is the invention (5), a first basis is searched so that $h_i$ may be maximum in the following formula, $$h_i = <d \cdot u_i>^2 / \|u_i\|^2$$

wherein $<d>$ is the differential vectors and $<u_i>$ is the base extraction vectors.

According to the invention (5), such condition that square norm $\|<d>-<\alpha_i u_i>\|^2$ of the difference with the differential vectors $<d>$ is minimum can be searched by the above simple calculation. Hence, the AOT processing can be carried out at high speed.

In the invention (6), a second basis is searched so that $h_i$ may be maximum in the following formula, $$h_i = \{<d \cdot u_i> - (<d \cdot u_1><u_1 \cdot u_i>/\|u_1\|^2)^2 / \{\|u_i\|^2 - (<u_1 \cdot u_i>)/\|u_1\|^2\}$$

wherein $<d>$ is the differential vectors, $<u_1>$ is the base extraction vectors corresponding to the first basis, and $<u_i>$ is the base extraction vectors for searching the second basis in the invention (3) or (4).

According to the invention (6), the AOT processing can be done more efficiently and at higher speed in addition to the advantages of the invention (5), because the calculation result which has been obtained in the first basis search can be used with respect to $<d \cdot u_1>$ and $\|u_1\|$ of the numerator, and $\|u_i\|^2$ and $\|u_1\|$ of the denominator.

In a preferred embodiment of the invention (3) or (4) that is the invention (7), a third basis is searched so that $h_i$ may be maximum in the following formula, $$h_i = (<d \cdot u_i> - <d \cdot v_1><v_1 \cdot u_i> - <d \cdot v_2><v_2 \cdot u_1>)^2 / \{\|u_i\|^2 - <v_1 \cdot u_i>^2 - <v_2 \cdot u_i>^2\}$$

wherein $<d>$ is the differential vectors, $<v_1>$ is the first orthonormal base vectors, $<v_2>$ is the second orthonormal base vectors, and $<u_i>$ is the base extraction vectors for searching the third basis.

According to the invention (7), the AOT processing can be done more efficiently and at higher speed in addition to the advantages of the invention (5) and (6), because the calculation result which has been obtained in the first and second basis search can be used with respect to ($<d \cdot u_i>-<d \cdot v_1><v_1 \cdot u_i>$) of the numerator, and ($\|u_i\|^2-<v_1 \cdot u_i>^2$) of the denominator.

In a preferred embodiment of the invention (6) or (7) that is the invention (8), the base extraction vectors $<u_i>$ which match with search conditions are subjected to orthogonal transform with one or more preceding orthonormal basis.

That is, one orthonormal processing per each base extraction vector $<u_i>$, which is adopted as the basis after the search termination at each stage is carried out, whereby the AOT processing can be done more efficiently and at higher speed.

In the image encoding method of the invention (9), the norm of each scalar expansion coefficient $\beta_1 \sim \beta_m$ is rearranged in decreasing order, a difference (including 0) between norms adjacent to each other is calculated, and Huffman coding is applied to the obtained difference. In the method, the basis is represented by $\beta_k <u_k>$, wherein k=1~m.

In general, the norm of each scalar expansion coefficient $\beta_1 \sim \beta_m$ can take various value. When the value is rearranged in ascending or descending order and the difference (including 0) between norms adjacent to each other is calculated, each difference is often similar to or same as each other. The more encoding compression is possible by applying the Huffman coding to the difference value.

In the image encoding method of the invention (10), image data $<R_j>$ of coding objective block is encoded instead of the coding of the basis, where the basis is more than certain number. Accordingly, the decoded image quality is improved. In practical, it does not affect the coding compression ratio because such situation is little.

The above object of the invention can be resolved by the construction, for example, as shown in FIG. 14. That is, the image decoding method of the invention (11) comprises reproducing a DC image corresponding to each block mean value per B pixel from encoding data with respect to the HVQ system, making a part of said DC image a DC nest, reproducing image data $<R_j>$ of target block by synthesizing, to DC value $DC_J$ of target block, one or more basis vectors $\beta_k<u_k>$ which is selected from DC nests based on the encoding data, and the lowest n (n=$\log_2$ B) bits of the DC pixel in each sample is set to 0, where the selected block is down-sampled from the DC nest and the block mean value of it is calculated using the samples.

Accordingly, any fraction less than 1 does not occurs in the block mean value and the block mean value with integer level precision is obtained at high speed.

According to the image decoding method in the invention (12), where the decoded basis is information with respect to $\beta_k<u_k>$ (k=1~m), the lowest n (n=$\log_2$ B) bits of the DC pixel per each selected block ($U_k$) to be read out from the DC nest are set to 0, product-sum calculation of basis $\beta_k<u_k>$ (k=1~m) is carried out, and the calculated result is divided by the number B of block pixels.

In the invention (12), the lowest n bits of each selected block ($U_k$) are set to 0, and hence, even if these are accumulated and added, the addition result becomes multiple of integer of the block size B (e.g. 16). An expansion coefficient $\beta_k$ is an integer precision. Accordingly, if the cumulative addition result is divided by the number B of the block pixels, block mean value $A_j$ is efficiently obtained by one processing. Therefore, such calculation that the basis vectors $\beta_k<u_k>$ (k=1~m) are overlapped can be effectively carried out.

In a preferred embodiment of the invention (11) or (12) that is the invention (13), the lowest n bits of each DC pixel is set to 0, where DC nests are produced from the DC image, whereby processing is effectively carried out.

The image encoding apparatus of the invention (14) comprises producing a DC image composed of each block mean value by dividing an image data per B pixel into a block, making a part of said DC image a DC nest, and where a differential vector $<d_j>$ which is obtained by separating the DC value $DC_J$ from the pixel block to be encoded is over an allowable value Z, calculating one or more orthogonal basis ( e.g. $\alpha_k<v_k>$), to which the differential vector $<d_j>$ is approximated, by the adaptive orthogonal transform (AOT) using the DC nest, and providing a memory 17 to store the DC nest in which the lowest n (n=$\log_2$ B) bits of the DC pixel are set to 0.

The image decoding apparatus of the invention (15) comprises reproducing a DC image corresponding to each block mean value per B pixel from encoding data with respect to the HVQ system, making a part of said DC image a DC nest, reproducing image data$<R_j>$ of target block by synthesizing, to the DC value DC, of target block, one or more basis vectors $\beta_k<u_k>$ which is selected from DC nests based on the encoding data, and providing a memory 49 to store the DC nest in which the lowest n (n=$\log_2$ B) bits of the DC pixel are set to 0.

The recording medium of the invention (16) comprises a computer readable recording medium storing a program to make a computer to implement the processing described in one of the invention (1) to (13).

BRIEF DESCRIPTION OF THE DRAWINGS

FIG. 12 is an explanatory drawing (2) of a DC nest, which is an embodiment of the invention;

FIG. 13 is an image drawing of a compression encoding processing of the expansion coefficient;

DETAILED DESCRIPTION OF THE INVENTION

Figure 1:
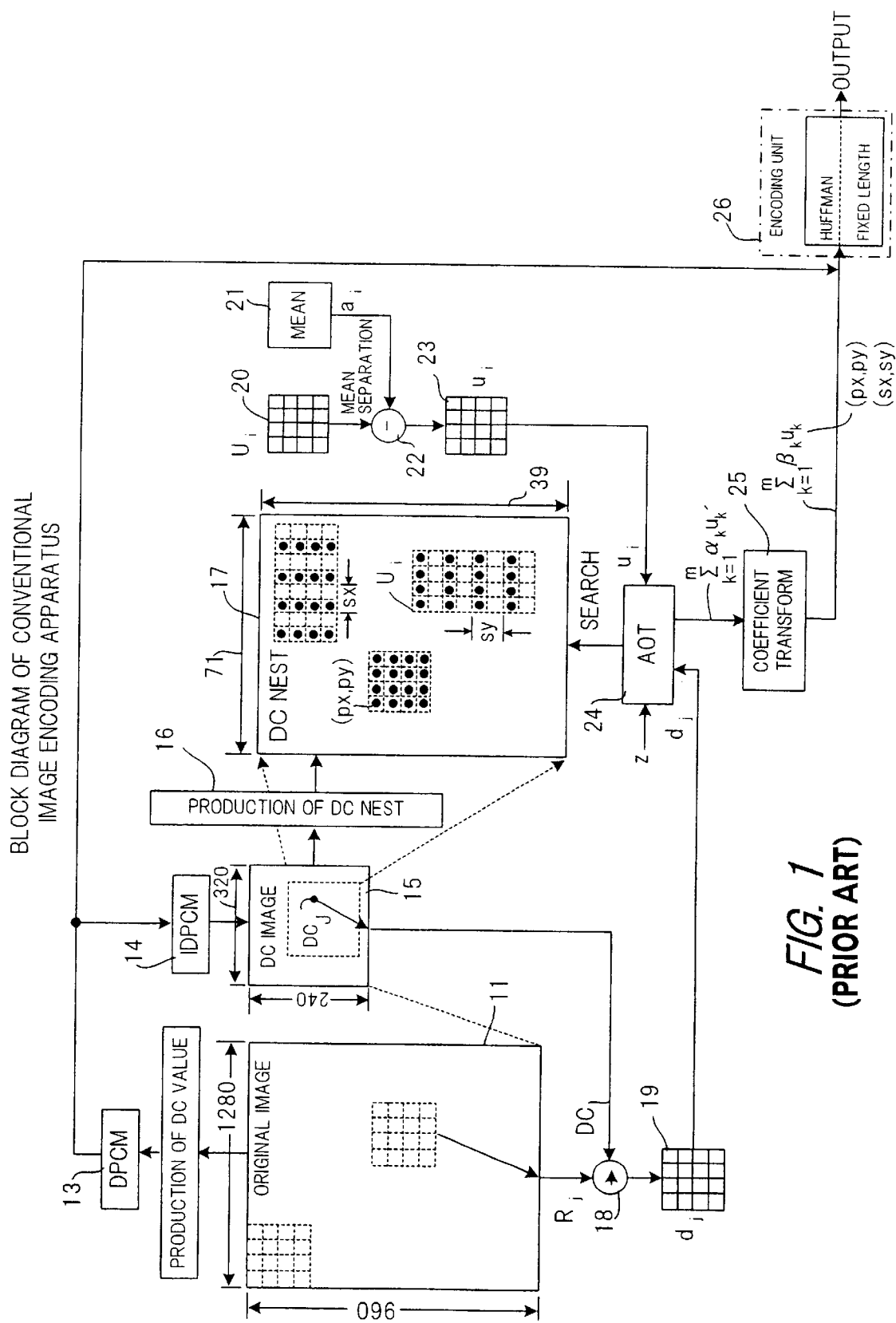
FIG. 1 is a block diagram showing a conventional image encoder.

Referring to the drawings, suitable embodiments of the invention will be explained in detail. The same sign indicates same or corresponding part through whole drawings.

Figure 6:
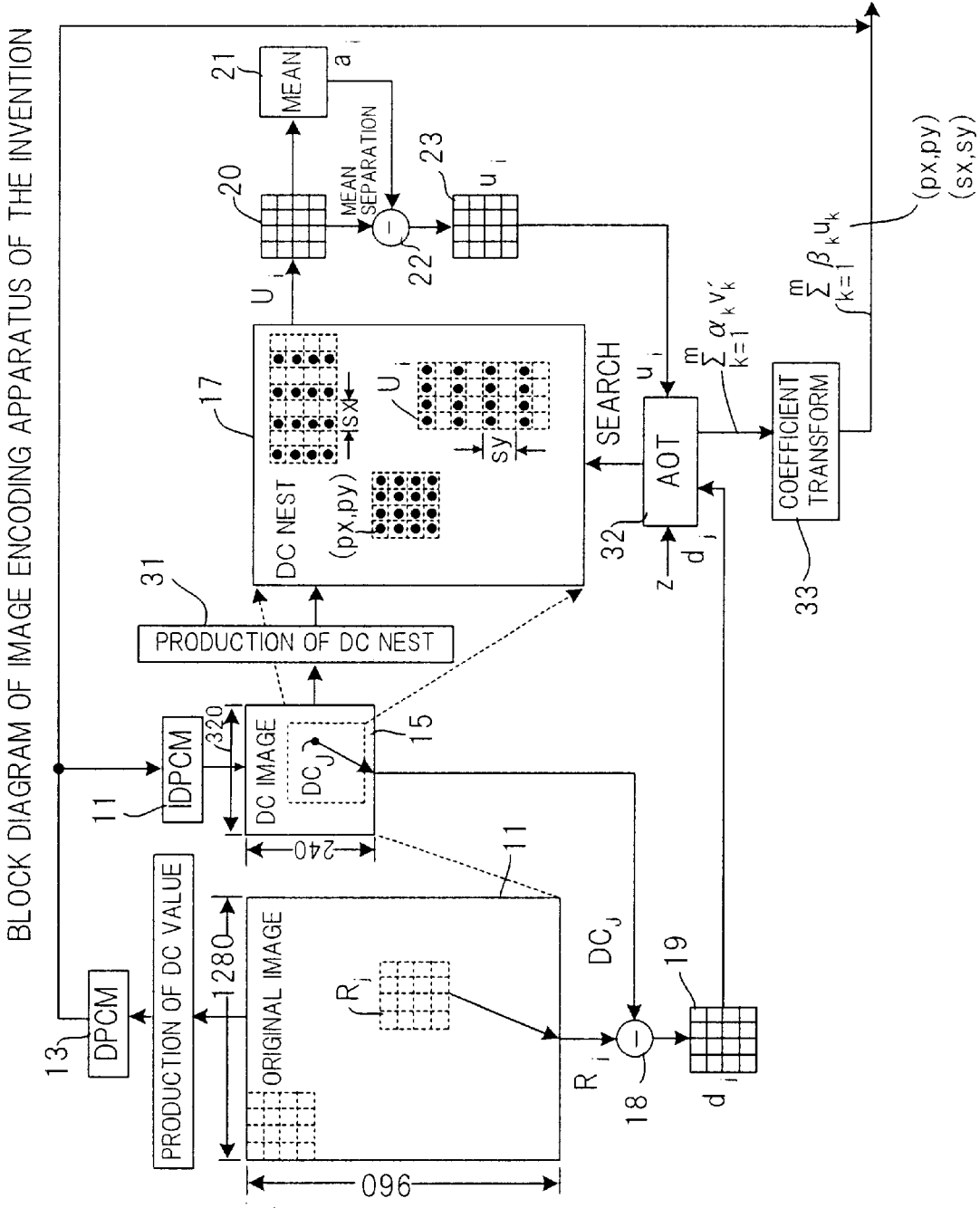
FIG. 6 is a block diagram showing an image encoder, which is an embodiment of the invention.

In FIG. 6 which is a block diagram showing an embodiment of image encoding apparatus in the invention, 31 is a DC nest production unit which produces the DC nest from a decoding DC image according to the invention, 17 is a DC nest memory which stores the produced DC nest, 32 is an adaptive orthogonal transform (AOT) processing unit which effectively implements AOT processing at high speed, 33 is a coefficient transform unit, and 34 is an encoding unit which can make an expanding coefficient $\beta_k$ higher compression. The other construction is same as in FIG. 1. The feature of each unit will be apparent from the following explanation of behavior.

Figure 7:
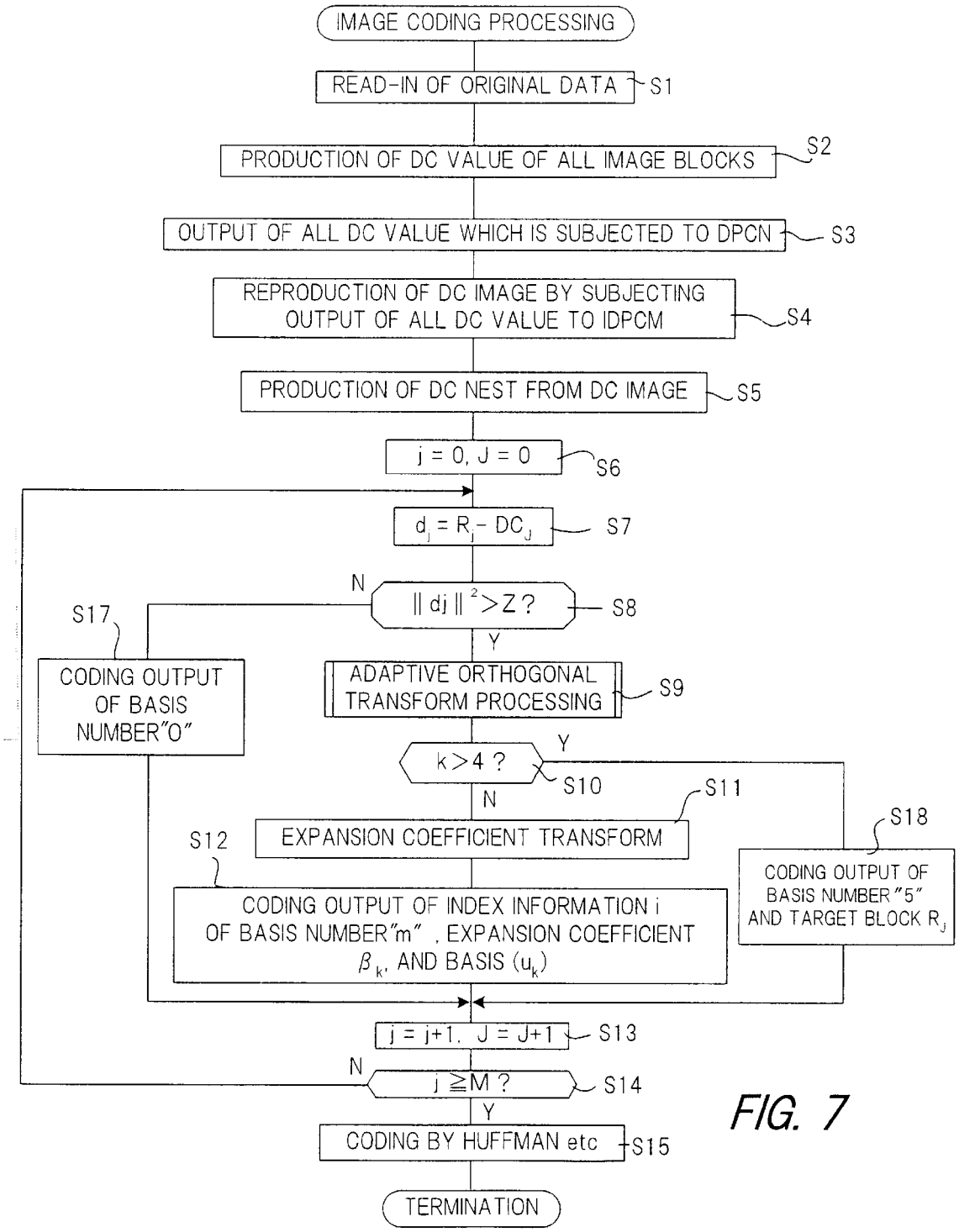
FIG. 7 is a flow chart showing a main image encoding processing which is an embodiment of the invention.

In FIG. 7, which is a flow chart showing a main image encoding processing, which is an embodiment of the invention, an original image data is input in a original image memory 11 at step S1. For example, an objective image of R.G.B. is converted to an image of Y.U.V., which is input in the memory 11. Y is a brightness data, U and V are color difference data. U and V are down-sampled using a brightness mean of 2 pixels in a horizontal direction. As an example, the brightness data Y is composed of vertical 960×horizontal 1280 pixels and, for example, 8 bits are allotted to each pixel. The processing of the brightness data Y will be mainly explained in the following but U and V are similarly processed.

A block mean (DC) value of every 4×4 pixels with respect to all image data is calculated at step S2. The first decimal place is round off at the time. All DC values are encoded by conventional two-dimensional DPCM method, etc. and are output at step S3. At step S4, all DPCM outputs are decoded by IDPCM method to reproduce the DC images, which are stored in a DC image memory 15. This is done to equalize AOT processing conditions in the encoding side with that in the decoding side. At step S5, the DC nest is reproduced from the DC images in the DC nest production unit 31, which is stored in the DC nest memory 17. A range from which the DC nest is cut can be selected by the same manner as conventional one.

In FIG. 11(a), the lowest 4 bits of each DC pixel $DC_J$ cut from the DC image memory 15 are masked (are set to 0) which are stored in a nest pixel $N_J$ of the DC nest memory 17. The lowest 4 bits are in relation with $2^4$=B (B=block size 16) or 4=$\log_2$ B. As such result that the lowest 4 bits are masked, the sum of base extraction block $<U_i>$ is always multiple of integer and a block mean value $a_i$ which is 1/16 of the sum is always an integer. Accordingly, the base extraction vectors $<u_i>$ which are obtained by separating the block mean value $a_i$ from the base extraction block $<U_i>$ are always 0.

In FIGS. 11(a) and (b), graphs of concrete values are shown as example, in which mean of 4 pixels is used for simplifying the explanation. In FIG. 11(c), even if a plurality of basis vectors $\beta_k<u_k>$ are cumulatively added to the DC pixel $DC_J$ of a decoding block $<R_j>$, a noise is not overlapped as usual because the block mean value of each basis vectors $\beta_k <u_k>$ is always 0, whereby image quality can be much improved.

Figure 11:
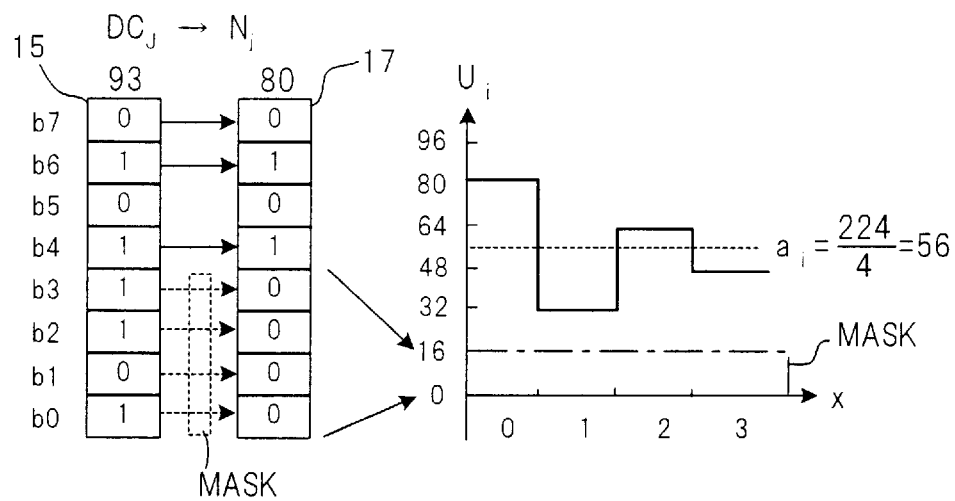
FIG. 11 is an explanatory drawing (1) of a DC nest, which is an embodiment of the invention.
Figure 11:
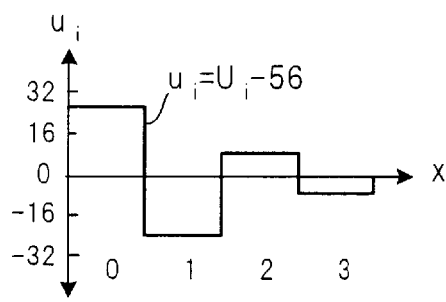
Figure 11:
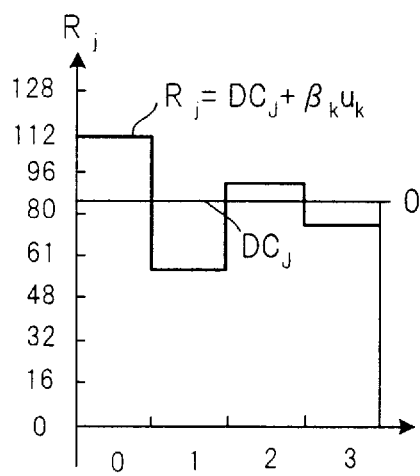

The examples of the value in FIG. 11 are shown in FIG. 12(a). The sum of the DC pixels A to D is 251 and its mean is 251/4=62.75 (non-integer). The lowest 4 bits are masked when the DC pixels A to D are transmitted to the nest pixels A to D, whereby the sum of the nest pixels A to D is 224 and its mean value AV is 224/4=56 (integer). Each element a to d of the base extraction vectors $<u_i>$ which is obtained by separating the mean value 56 of the nest pixels from the nest pixels becomes 24, −24, 8 and −8, respectively. The sum of these elements is 0 (complete mean value separation).

The same value as in FIG. 12(a) is shown in FIG. 12(b) except that the DC pixels A to D are copied into the nest pixels A to D and the lowest 4 bits are masked from the sum of the nest pixels A to D. According to the method, the sum is the multiple of 16 and the block mean value is 60 (integer). However, according to the method, each element a to d of the base extraction vectors $<u_i>$ which is obtained by separating the mean value 60 of the nest pixels from the nest pixels A to D becomes 33, −25, 13 and −10, respectively. The sum of these elements is not 0 (complete mean value separation).

As shown in FIG. 12(b), after a part of the DC images is copied into the nest pixels A to D, the lowest 4 bits may be masked from each pixel when the base extraction block $<U_i>$ is down-sampled from the DC nest.

Turning to FIG. 7, each index counter j, J to the original image memory 11 and the DC image memory 15 is initialized to 0 at step S6, wherein j indicates an index counter of the target block $<R_j>$ which is encoding object, and J indicates an index counter of the DC pixel. At step S7, the differential vector $<d_j>$ is obtained by separating a corresponding decoding DC value $DC_J$ from the target block $<R_j>$. At step S8, it is judged whether the square norm $\|d_j\|^2$ of the differential vector is more than the allowable error Z or not. In case that $\|d_j\|^2$ is not more than Z, 0 is output as the number of the basis at step S17. In this case, the target block $<R_j>$ is decoded by alternating current component prediction method as described hereinafter. In case that $\|d_j\|^2$ is more than Z, the adaptive orthogonal transform (AOT) processing method as described hereinafter is carried out at step S9.

At step S10, it is judged whether the number of the basis k produced by the adaptive orthogonal transform is more than 4 or not. According to the actual measurement, statistic result of k=1 to 3 has been obtained in most cases. Therefore, in case that k is more than 4, "5" is code-output as the number of the basis at step S18 and each pixel value of the target block $<R_j>$ is output. In case that k is not more than 4, conversion to expanding coefficient $\beta_k$ is carried out as described hereinafter at step S11. At step S12, the basis number m, the expanding coefficient $\beta_k$ and the index information i of non-orthogonal basis vector $<u_i>$ each is code-output at step S12.

At step S13, "1" is added to the counters j and J, respectively. In the step, an addition of 1 to the counter j means renewal of onepixel block. It is judged at step S14 whether j is not less than M (the number of all image blocks) or not. In case that j is less than M, turning to step S7 and same encoding processing is repeated with respect to a next target block $<R_j>$, followed by same steps. It is judged at step S14 that j is not less than M, then encoding processing, for example, by Huffman method is carried out at step S15 as described hereinafter. Thus, encoding processing of one pixel is terminated.

Figure 8:
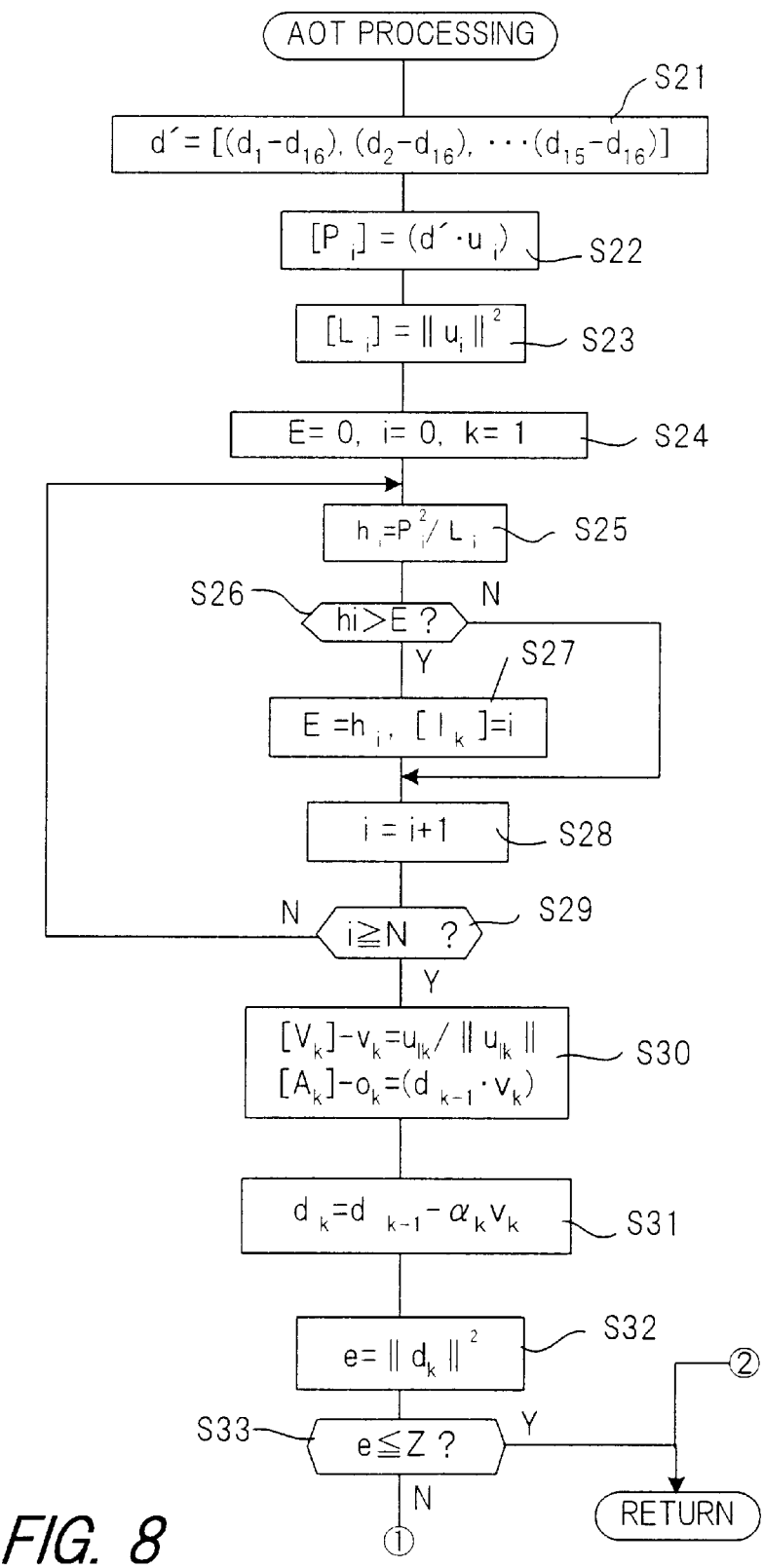
FIG. 8 is a flow chart (1) showing an adaptive orthogonal transform processing which is an embodiment of the invention.
Figure 9:
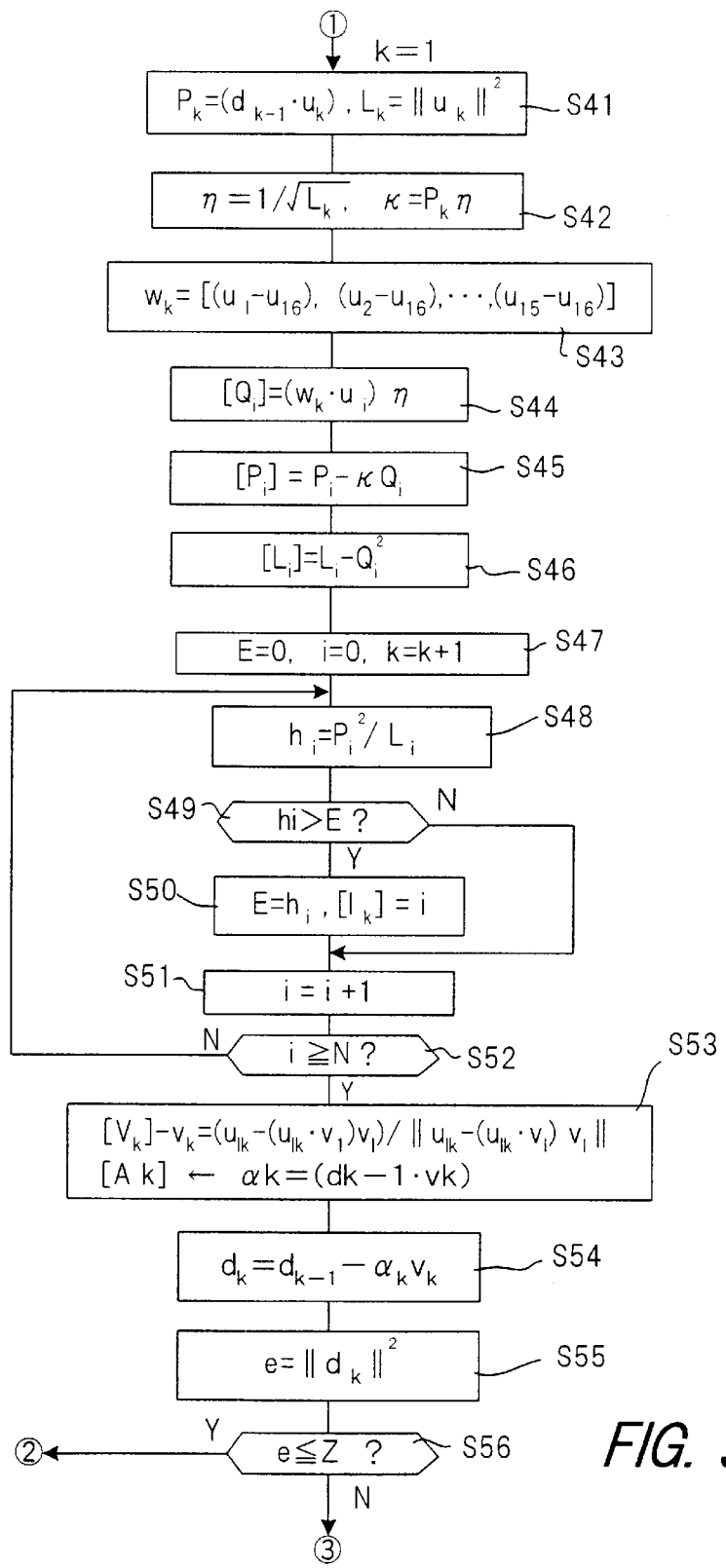
FIG. 9 is a flow chart (2) showing an adaptive orthogonal transform processing which is an embodiment of the invention.
Figure 10:
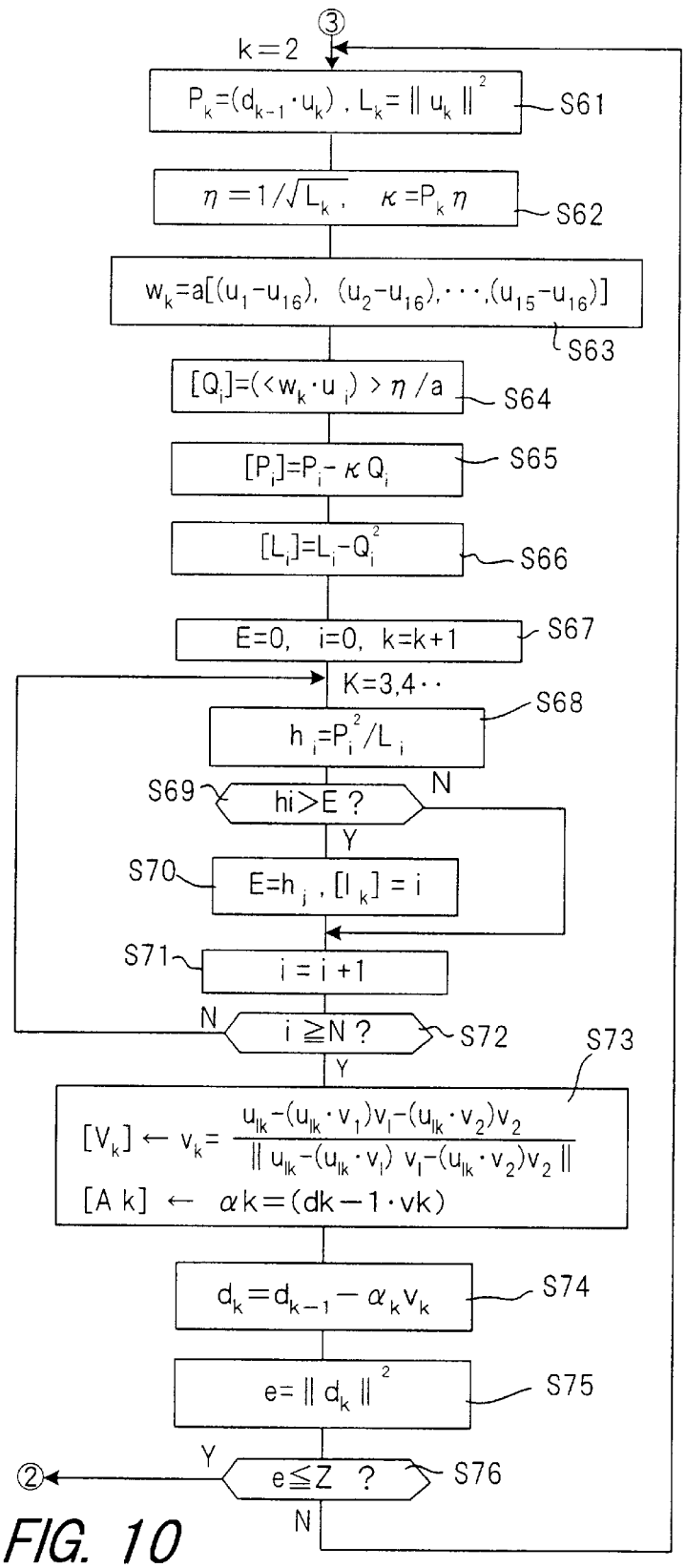
FIG. 10 is a flow chart (3) showing an adaptive orthogonal transform processing which is an embodiment of the invention.

In FIGS. 8 to 10, each of which is a flow chart (1), (2) or (3) of the adaptive orthogonal transform processing, it is shown that the minimum necessary number of orthogonal basis $\alpha_k <v_{k>}$ $_{(k=1 \sim m)}$ is effectively obtained at high speed. In the following explanation, the initial differential vector $<d_j>$ obtained at the step S7 is represented by $<d>$ and the differential vector to be renewed later is represented by $<d_k>$ (k=1~m).

A search processing of first basis is shown in FIG. 8. Before explanation of the processing, an idea on calculation for high speed processing will be explained. That is, the first basis is usually obtained as base extraction vector $<u_i>$, which makes a square norm $e_i$ of the difference between the first basis and a differential vector $<d>$ minimum, and is represented by the formula (7).

[Numeral 7]

$$e_i = \left\| d - \frac{\langle d \cdot u_i \rangle}{\|u_i\|^2} u_i \right\|^2 \qquad (7)$$

$$= \|d\|^2 - 2\frac{\langle d \cdot u_i \rangle^2}{\|u_i\|^2} + \frac{\langle d \cdot u_i \rangle^2}{\|u_i\|^4}\|u_i\|^2$$

$$= \|d\|^2 - \frac{\langle d \cdot u_i \rangle^2}{\|u_i\|^2} \qquad u_i = u_i'$$

The first item $\|d\|^2$ of the right side in the formula (7) which is more than 0 is independent of an extracted basis and hence, $<u_i>$ that makes the second item of the right side in the formula (7) maximum can be the first basis. The second item $h_i$ of the right side is represented by the formula (8).

[Numeral 8]

$$h_i = \frac{\langle d \cdot u_i \rangle^2}{\|u_i\|^2} \qquad (8)$$

A processing for searching and judging the first basis $\alpha_k$ $<v_k>$ which makes $h_i$ maximum is explained. At step S22, the fifteen dimensional vector $<d'>$ is obtained by subtracting the sixteenth component of $<d>$ from the remaining components as a preprocessing to inner product calculation $<d \cdot u_i>$ as described hereinafter. At step S22, the inner product $<d' \cdot u_1>$ of $h_i$ numerator is obtained with respect to i=0~(N-1) and is stored in an arrangement $[P_i]$ {i=0~(N-1)}.

More concretely, $<u_i>$ is sixteen dimensional vector, but its sixteenth component $u_{16}$ can be represented by linear bond of the remaining fifteen components because the block mean value (sum of all elements) is 0.

[Numeral 9]

$$u_1 = [u_1, u_2, u_3, \ldots, u_{16}] u_1 u_2 + \ldots + u_{16} = 0 \; u_{16} = -(u_1 + u_2 + \ldots + u_{15}) \qquad (9)$$

Accordingly, the inner product $<d \cdot u_i>$ of $hi$ numerator can be calculated from $<d' \cdot u_i>$ equivalent thereto, whereby one product/sum calculation can be omitted which corresponds to 8192 calculations with respect to total of i.

[Numeral 10]

$$\langle d \cdot u_i \rangle = d_1 u_1 + d_2 u_2 + \ldots + d_{15} u_{15} - d_{16}(u_1 + u_2 + \ldots + u_{15}) \qquad (10\text{-}1)$$

$$= (d_1 - d_{16})u_1 + (d_2 - d_{16})u_2 + \ldots + (d_{15} - d_{16})u_{15}$$

$$= \langle d' \cdot u_i \rangle$$

$$d' = [(d_1 - d_{16}), (d_2 - d_{16}), \ldots, (d_{15} - d_{16})] \qquad (10\text{-}2)$$

At step S23, the square norm $\|u_i\|^2$ of $h_i$ denominator is obtained with respect to i=0~(N-1) and is stored in an arrangement $[L_i]$ {i=0~(N-1)}.

[Numeral 11]

$$\|u_i\|^2 = u_1^2 + u_2^2 + \ldots + u_{16}^2 \qquad (11)$$

The arrangement $[L_i]$ is repeatedly used. At step S24, a register E=0 storing a maximum value of $h_i$, an index counter i=0 of the base extraction vector $<u_i>$ and a basis number counter k=1 are initialized, respectively.

At step S25, a value for $h_i = P_i^2/L_i$ is calculated. Step S26, it is judged whether $h_i$ is more than E or not. In case that $h_i$ is more than E, E is renewed by $h_i$ at step S27 and i is held in an arrangement $[I_k]$ (k=1). In case that $h_i$ is not more than E, the processing at Step S27 is skipped.

At step S28, 1 is added to i and at step S29, it is judged whether i is not less than N (total extraction numbers) or not. In case that i is less than N, turning to step S25 and maximum value search processing is carried out with respect to next $h_i$ similar to above.

The same processing is repeated and the search of all nest blocks is terminated when i is not less than N. At the time, the index value i of the first basis vector $<u_i>$ which makes $h_i$ maximum is held in an arrangement $[I_k]$.

At step S30, the first basis vector $<u_i>$ is normalized to be a normalized basis vector $<v_i>$ which is stored in an arrangement $[V_k]$ (k=1). And, a scalar coefficient $\alpha_1$ (projection shadow of $<d>$ on $<v_i>$ is calculated and is stored in an arrangement $[A_k]$ (k=1).

At step S31, the differential vector $<d>$ is approximated to the first basis and is renewed by the differential vector $<d_1> = <d> - \alpha_1 <v_1>$. At step S32, a square norm $e = \|u_1\|^2$ of new differential vector is calculated and at step S33, it is judged whether e is not more than Z or not. In case that e is not more than Z, the AOT processing is terminated at the step. In case that e is more than Z, the search processing of the second basis is carried out.

A search processing of the second basis is shown in FIG. 9. Before explanation of the processing, an idea on efficient calculation will be explained. That is, the second basis is usually obtained as orthogonal vector $<u_i'>$ which makes a square norm $e_i$ of the difference between the second basis and a differential vector $<d_1>$ minimum, and is represented by the formula (12).

[Numeral 12]

$$e_i = \left\| d_1 - \frac{\langle d_1 \cdot u_i' \rangle}{\|u_i'\|^2} u_i' \right\|^2 \qquad (12)$$

$$= \|d_1\|^2 - 2\frac{\langle d_1 \cdot u_i' \rangle^2}{\|u_i'\|^2} + \frac{\langle d_i \cdot u_i' \rangle^2}{\|u_1'\|^4}\|u_i'\|^2$$

$$= \|d_1\|^2 - \frac{\langle d_1 \cdot u_i' \rangle^2}{\|u_i'\|^2}$$

The orthogonal vector $<u_i'>$ is obtained by orthogonal transform of the second base extraction vector $<u_i>$ to the first normalized basis vector $<v_1>$.

[Numeral 13]

$$u_i' = u_i - \frac{\langle u_i \cdot v_1 \rangle}{\|v_1\|^2} v_i = u_i - \langle u_i \cdot v_1 \rangle v_1 \qquad (13)$$

The first item $\|d\|^2$ of the right side in the formula (12) which is more than 0 is independent of an extracted basis and hence, $<u_i'>$ that makes the second item of the right side in the formula (12) maximum can be the second basis. The second item $h_i$ of the right side is represented by the formula (14).

[Numeral 14]

$$h_i = \frac{\langle d_1 \cdot u_i' \rangle^2}{\|u_i'\|^2} \qquad (14)$$

According to the formula (14), $h_i$ can be calculated but the denominator of the formula (14) may be transformed in order to effectively utilize the calculation result in FIG. 8. That is, if the orthogonal vector $<u_i'>$ of the $h_i$ numerator is represented by the base extraction vector $<u_i>$, the $h_i$ numerator can be represented by the formula (15).

[Numeral 15]

$$\langle d_1 \cdot u'_i \rangle^2 = \langle d_1 \cdot (u_i - \langle u_i \cdot v_1 \rangle v_1) \rangle^2 \quad (15)$$
$$= (\langle d_1 \cdot u_i \rangle - d_1 \cdot \langle u_i \cdot v_1 \rangle v_1)^2$$
$$= \langle d_1 \cdot u_i \rangle^2 \qquad \because \langle d_1 \cdot v_1 \rangle = 0$$

Further, if the differential vector $<d_1>$ of the formula (15) is represented by the first differential vector $<d>$, the $h_i$ numerator can be represented by the formula (16).

[Numeral 16]

$$\langle d_1 \cdot u_i \rangle^2 = \langle (d - \langle d \cdot v_1 \rangle v_1) \cdot u_i \rangle^2 \quad (16)$$
$$= (\langle d \cdot u_i \rangle - \langle d \cdot v_1 \rangle \langle v_1 \cdot u_i \rangle)^2$$
$$= \left( \langle d \cdot u_i \rangle - \frac{\langle d \cdot u_1 \rangle}{\|u_1\|} \frac{\langle u_1 \cdot u_i \rangle}{\|u_1\|} \right)^2$$

Accordingly, the calculation result $<d \cdot u_1>$ which is obtained in the search of the first basis can be used for calculation of the $h_i$ numerator. Also, when the $h_i$ denominator is transformed, it can be represented by the formula (17).

[Numeral 17]

$$\|u'_i\| = \|u_i - \langle u_i \cdot v_1 \rangle v_1\|^2 \quad (17)$$
$$= \|u_i\|^2 - 2\langle u_i \cdot v_1 \rangle^2 + \langle u_i \cdot v_1 \rangle^2 \|v_1\|^2$$
$$= \|u_i\|^2 - \langle u_i \cdot v_1 \rangle^2$$
$$= \|u_i\|^2 - \left( \frac{\langle u_i \cdot u_1 \rangle}{\|u_1\|} \right)^2$$

Accordingly, The calculation result $\|u_i\|^2$, $\|u_1\|$ which is obtained in the first basis search can be used in the calculation of the $h_i$ numerator. When $h_i$ is placed in the formula (14), it can be represented by the formula (18-1) and finally by the formula (18-2).

[Numeral 18]

$$h_i = \frac{\left( \langle d \cdot u_i \rangle - \frac{\langle d \cdot u_1 \rangle}{\|u_1\|} \frac{\langle u_1 \cdot u_i \rangle}{\|u_1\|} \right)^2}{\|u_i\|^2 - \left( \frac{\langle u_i \cdot u_1 \rangle}{\|u_1\|} \right)^2} \quad (18\text{-}1)$$

$$= \frac{\left( P - \frac{P_k}{\sqrt{L_k}} \frac{\langle u_k \cdot u_i \rangle}{\sqrt{L_k}} \right)^2}{L_i - \left( \frac{\langle u_k \cdot u_i \rangle}{\sqrt{L_k}} \right)^2} \quad (18\text{-}2)$$

A calculating result of the arrangement $[P_i]$, $[L_i]$ can be used for $P_i=<d_1 \cdot u_i>$, $L_i=\|u_1\|^2$, respectively and the preceding result can be used for $P_k=P_i=<d \cdot u_1>$, $\sqrt{L_k}=\sqrt{L_1}=\|u_1\|$. Accordingly, it is in a part of $<u_k \cdot u_i>=<u_1 \cdot u_i>$ that a calculation is newly required.

Based on the background as above, a search of the second basis is carried out by the following calculation. That is, at step S41, $P_1=<d \cdot u_1>$ and $L_1=\|u_1\|^2$ are held as k=1. The result obtained in steps S22 and S23 can be used. The numeral "1" of $P_1$ means the first basis $<u_1>$ in the index counter i and is held in an arrangement $[I_k]$ at step S27. At step S42, a calculation is carried out by the formula (19) and a result is stored in a register η, κ.

[Numeral 19]

$$\eta = \frac{1}{\sqrt{L_k}} \qquad \kappa = P_k \eta \quad (19)$$

At step S43, the fifteen dimensional vector $<w_1>$ is obtained by subtracting the sixteenth component of $<u_1>$ from the remaining components as the preprocessing of inner product calculation $<u_1 \cdot u_i>$ as described below. At step S44, an inner product $<w_k \cdot u_i>$ is calculated with respect to i=0~(N−1) and is stored in an arrangement $[Q_i]$. At step S45, $(P_i-\kappa Q_i)$ is calculated with respect to i=0~(N−1) and is stored in and written in over an arrangement $[P_i]$. The calculation result at step S45 is stored in (written in over) an arrangement $[P_i]$, whereby contents of the arrangement $[P_i]$ are gradually renewed on the past calculation result. Further, at step S46, $(L_i-Q_i^2)$ is calculated with respect to i=0~(N−1) and is stored in and written in over an arrangement $[L_i]$. $L_i$ in the right side is a result of the calculation at step S23. The calculation result at step S46 is stored in and written in over an arrangement $[L_i]$ at step S23, whereby contents of the arrangement $[L_i]$ are gradually renewed on the past calculation result. The repeated calculation of $h_i$ is finally represented by the formula (20).

[Numeral 20]

$$h_i = \frac{(P_i - \kappa Q_i)^2}{L_i - Q_i^2} = \frac{P_i^2}{L_i} \quad (20)$$

At step S24, a register E=0 holding a maximum value of $h_i$ and an index counter i=0 of the base extraction vector $<u_i>$ are initialized, respectively and "1" is added to a basis number counter k to be k=2.

At step S48, $h_i=P_i^2/L_i$ is calculated. At step S49, it is judged whether $h_i$ is more than E or not In case that $h_i$ is more than E, E is renewed by $h_i$ at step S50 and i is stored in an arrangement $[I_k]$ (k=2). In case that $h_i$ is not more than E, the processing at step S50 is skipped.

At step S51, "1" is added to i and at step S52, it is judged whether i is not less than N or not. In case that i is less than N, turning to step S42 and the maximum value search processing is carried out with respect to subsequent $h_i$. When the same procedure was proceeded and i is not less than N, the search of the all nest blocks are terminated. At the time, the index value of the second basis vector $<u_i>$ to make $h_i$ maximum is held in an arrangement $[I_k]$ (k=2).

At step S53, the second basis vector $<u_2>$ is subjected to orthonormal with $<v_1>$ to be a normalized basis vector $<v_2>$ which is stored in an arrangement $[V_k]$ (k=2). A scalar coefficient $\alpha_2$ which is a shadow of $<d_1>$ projected to $<v_2>$ is calculated and is stored in an arrangement $[A_k]$ (k=2). The ortho normalization of the basis vector $<u_2>$ and the calculation of the scalar coefficient $\alpha_2$ are carried out at one time with respect to the above search result, whereby the AOT processing is much simplified at high speed.

At step S54, the differential vector $<d_1>$ is closed to the second basis and is renewed by the differential vector $<d_2>=<d_1>-\alpha_2 <v_2>$. At step S55, a square norm $e=\|u_2\|^2$ of new differential vector is calculated and at step S56, it is judged whether e is not more than Z or not. In case that e is not more than Z, the AOT processing is terminated at the step. In case that e is more than Z, the search processing of the third basis is carried out.

A search processing of the second basis is shown in FIG. 6. Before explanation of the processing, an idea on efficient calculation will be explained. That is, the third basis is usually obtained as orthogonal vector $<u_j'>$ which makes a square norm $e_i$ of the difference between the second basis and a differential vector $<d_2>$ minimum, and is represented by the formula (21).
[Numeral 21]

$$e_i = \left\| d_2 - \frac{\langle d_2 \cdot u_i' \rangle}{\|u_i'\|^2} u_i' \right\|^2 \quad (21)$$

$$= \|d_2\|^2 - 2\frac{\langle d_2 \cdot u_i' \rangle}{\|u_i'\|^2} + \frac{\langle d_2 \cdot u_i' \rangle}{\|u_i'\|^4}\|u_i'\|^2$$

$$= \|d_2\|^2 - \frac{\langle d_2 \cdot u_i' \rangle^2}{\|u_i'\|^2}$$

The orthogonal vector $<u_i'>$ is obtained by orthogonalization of the third base extraction vector $<u_i>$ to the first normalized basis vector $<v_1>$ and the second normalized basis vector $<v_2>$.
[Numeral 22]

$$u_i' = u_i - <u_i \cdot v_1> v_1 - <u_i \cdot v_2> v_2 \quad (22)$$

The first item $\|d_2\|^2$ of the right side in the formula (21) which is more than 0 is independent of an extracted basis and hence, $<u_i'>$ that makes the second item of the right side in the formula (21) maximum becomes the third basis. The second item $h_i$ of the right side is represented by the formula (23).
[Numeral 23]

$$h_i = \frac{\langle d_2 \cdot u_i' \rangle^2}{\|u_i'\|^2} \quad (23)$$

If the orthogonal vector $<u_i'>$ of the $h_i$ numerator is represented by the base extraction vector $<u_i>$, the $h_i$ numerator can be represented by the formula (24).
[Numeral 24]

$$\langle d_2 \cdot u_i' \rangle^2 = \langle d_2 \cdot (u_i - \langle u_i \cdot v_1 \rangle v_1 - \langle u_1 \cdot v_2 \rangle v_2) \rangle^2 \quad (24)$$

$$= (\langle d_2 \cdot u_i \rangle - \langle d_2 \cdot v_1 \rangle \langle u_i \cdot v_1 \rangle - \langle d_2 \cdot v_2 \rangle \langle u_i \cdot v_2 \rangle)^2$$

$$= \langle d_2 \cdot u_i \rangle^2 \quad \because \langle d_2 \cdot v_1 \rangle = 0 \ \langle d_2 \cdot v_2 \rangle = 0$$

Further, if the differential vector $<d_2>$ of the formula (24) is represented by the first differential vector $<d>$, the $h_i$ numerator can be represented by the formula (25).
[Numeral 25]

$$\langle d_2 \cdot u_i \rangle^2 = \langle (d - \langle d \cdot v_1 \rangle v_1 - \langle d \cdot v_2 \rangle v_2) \cdot u_i \rangle^2 \quad (25)$$

$$= (\langle d_2 \cdot u_i \rangle - \langle d \cdot v_1 \rangle \langle v_1 \cdot u_i \rangle - \langle d \cdot v_2 \rangle \langle v_2 \cdot u_i \rangle)^2$$

$$= \left( \langle d \cdot u_i \rangle - \frac{\langle d \cdot u_1 \rangle}{\|u_1\|} \frac{\langle u_1 \cdot u_i \rangle}{\|u_1\|} - \frac{\langle d \cdot u_2' \rangle}{\|u_2'\|} \frac{\langle u_2' \cdot u_i \rangle}{\|u_2'\|} \right)^2$$

Also, when the $h_i$ denominator is transformed, it can be represented by the formula (26).
[Numeral 26]

$$\|u_i'\|^2 = \|u_i - \langle u_i \cdot v_1 \rangle v_1 - \langle u_i \cdot v_2 \rangle v_2\| \|u_i - \langle u_i \cdot v_1 \rangle v_1 - \langle u_i \cdot v_2 \rangle v_2\| \quad (26)$$

$$= \|u_i\|^2 - \langle u_i \cdot v_1 \rangle^2 - \langle u_i \cdot v_2 \rangle^2$$

When $h_i$ is placed in the formula (23), it can be represented by the formula (27).

[Numeral 27]

$$h_i = \frac{(\langle d \cdot u_i \rangle - \langle d \cdot v_1 \rangle \langle v_1 \cdot u_i \rangle - \langle d \cdot v_2 \rangle \langle v_2 \cdot u_i \rangle)^2}{\|u_i\|^2 - \langle u_i \cdot v_1 \rangle^2 - \langle u_i \cdot v_2 \rangle^2}$$

The second item of numerator and denominator in the formula (27) has been already calculated and is represented by the formula (28).

$$P_i = <d \cdot u_i> - <d \cdot v_1><v_1 \cdot u_i> \quad (28\text{-}1)$$

$$I_1 = \|u_i\|^2 - <u_i \cdot v_1>^2 \quad (28\text{-}2)$$

Accordingly, $h_i$ is represented by the formula (29) in the same manner as in the formula (18-2).
[Numeral 29]

$$h_i = \frac{\left( P_i - \frac{P_k}{\sqrt{L_k}} \frac{\langle v_k \cdot u_i \rangle}{\sqrt{L_k}} \right)^2}{L_i - \left( \frac{\langle v_k \cdot u_i \rangle}{\sqrt{L_k}} \right)^2} \quad (29)$$

Figure 5:
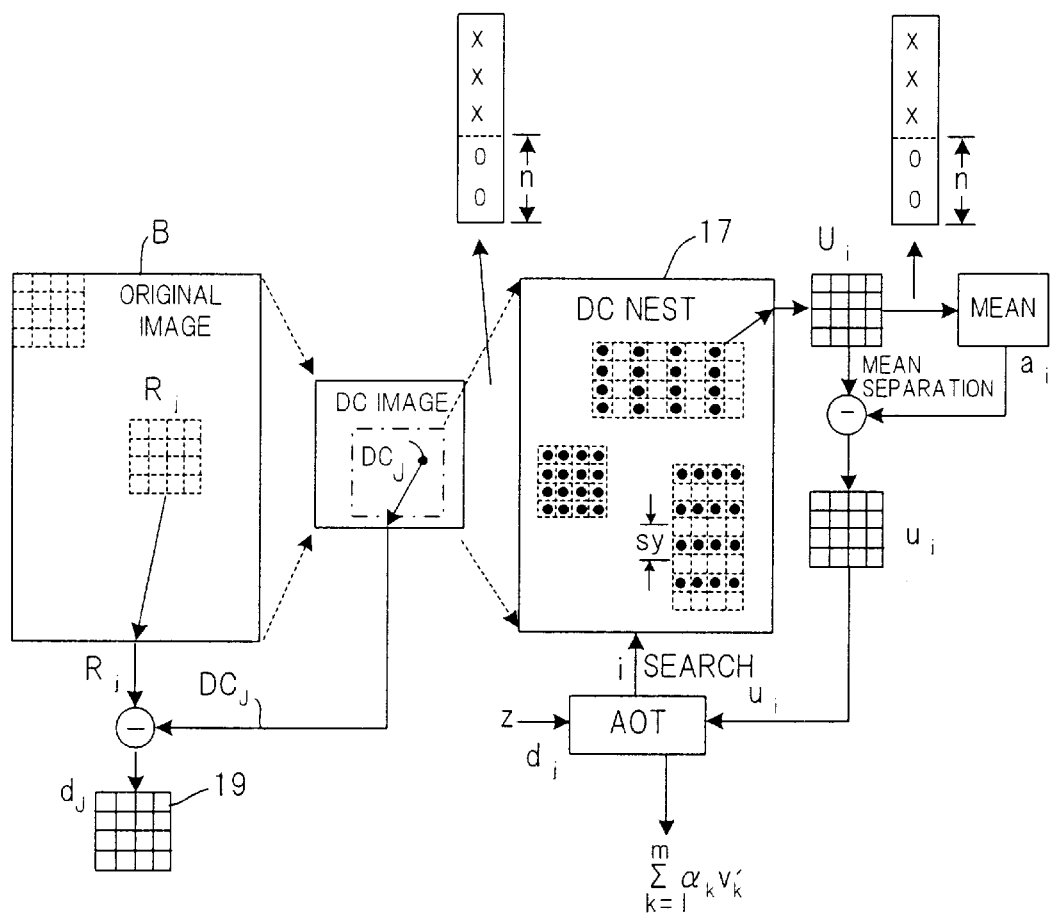
FIG. 5 is an explanatory drawing of the principle of the invention.

The formula (29) is same form as the formula (18-2) except that the inner product $<u_k \cdot u_i>$ is changed to $<v_k \cdot u_i>$. Accordingly, each basis hereinafter can be effectively obtained by repeating the same operation as in FIG. 5.

Based on the above processing, search of the third and following basis is calculated as follows. That is, $P_2=<d_1 \cdot u_2>$ and $L_2=\|u_2\|^2$ are hold by k=2 at stet S61. At step S62, calculation is carried out according to the formula (30) and a result is stored in the registers η and κ.
[Numeral 30]

$$\eta = \frac{1}{\sqrt{L_k}} \quad \kappa = P_k \eta \quad (30)$$

At step S63, the fifteen dimensional vector $<w_2>$ is obtained by subtracting the sixteenth component of $<v_2>$ from the remaining components as the preprocessing of inner product calculation $<v_2 \cdot u_i>$ as described below. Since each component of $<v_2>$ is not an integer, it is necessary that an inner product is calculated in the form of real number. In order to avoid the calculation in the form of real number, each component of $<v_2>$ (i.e.$<w_2>$) is multiplied by a constant "a" to make it an integer, in advance.

At step S64, an inner product $<w_2 \cdot u_i>\eta/a$ is calculated with respect to i=0~(N−1) and is stored in (written in over) an arrangement [$Q_i$]. At the time, each calculation result is divided by the constant a to put the position of a figure to the former position.

At step S65, ($P_i$−κ$Q_i$) is calculated with respect to i=0~(N−1) and is stored in (written in over) an arrangement [$P_i$]. At step S46, ($L_i$−$Q_i^2$) is calculated with respect to i=0~(N−1) and is stored in (written in over) an arrangement [$L_i$]. The calculation of the formula (29) is represented by the formula (31).
[Numeral 31]

$$h_i = \frac{(P_i - \kappa Q_i)^2}{L_i - Q_i^2} = \frac{P_i^2}{L_i} \quad (31)$$

At step S67, a register E=0 holding a maximum value of $h_i$ and an index counter i=0 of the base extraction vector $<u_i>$ are initialized, respectively and "1" is added to a basis number counter k to be k=3.

At step S68, $h_i=P_i^2/L_i$ is calculated. At step S69, it is judged whether $h_i$ is more than E or not. In case that $h_i$ is more than E, E is renewed by $h_i$ at step S70 and i is held in an arrangement $[I_k]$ (k=3). In case that $h_i$ is not more than E, the processing at step S70 is skipped.

At step S71, "1" is added to i and at step S72, it is judged whether i is not less than N or not. In case that i is less than N, turning to step S68 and the maximum value search processing is carried out with respect to subsequent $h_i$. When the same procedure was proceeded and i is not less than N, the search of the all nest blocks are terminated. At the time, the index value of the third basis vector $<u_3>$ to make $h_i$ maximum is held in an arrangement $[I_k]$ (k=3).

At step S73, the third basis vector $<u_3>$ is subjected to orthonormal transform with $<v_1>$ and $<v_2>$ to be a normalized basis vector $<v_3>$ which is stored in an arrangement $[V_k]$. A scalar coefficient $\alpha_3$ which is a shadow of $<d_2>$ projected to $<v_3>$ is calculated and is stored in an arrangement $[A_k]$.

At step S74, the differential vector $<d_2>$ is approximated to the third basis and is renewed by the differential vector $<d_3>=<d_2>-\alpha_3<v_3>$. At step S75, a square norm $e=\|d_3\|^2$ of new differential vector is calculated and at step S76, it is judged whether e is not more than Z or not. In case that e is not more than Z, the AOT processing is terminated at the step. In case that e is more than Z, turning to the step S61 and the preprocessing and search processing of the fourth and following basis are carried out. It is preferred that the processing to judge whether k is not less than 4 or not is provided (not shown) after the step S76, whereby the AOT processing can be skipped in case that k is not less than 4.

The AOT processing can be much simplified can be carried out at high speed by the above processing or operation. The actual calculation time is reduced to 1/3 to 1/10 in comparison with conventional methods.

Referring to FIG. 6, a group of $\alpha_k<v_k>$(k=1~m) is obtained from AOT 32 and the differential vector $<d_j>$ is approximated within the allowable error Z by the linear bond.

Further, in the coefficient transform unit 33, the expansion coefficient $\beta_k$ is obtained to transform the group of $\alpha_k<v_k>$ (k=1~m) to $\beta_k<u_k>$(k=1~m) by the following method. That is, when each matrix of the base extraction vector $<u_k>$, the expansion coefficient $\beta_k$, the orthonormal basis vector $<v_k>$ and the scalar coefficient $\alpha_k$ is represented by the formula (32)

[Numeral 32]

$$U = [u_1, u_2, \cdots u_m] \quad B = \begin{bmatrix} \beta_1 \\ \beta_2 \\ \vdots \\ \beta_m \end{bmatrix} \quad (32)$$

$$V = [v_1, v_2, \cdots v_m] \quad A = \begin{bmatrix} \alpha_1 \\ \alpha_2 \\ \vdots \\ \alpha_m \end{bmatrix}$$

a relationship of the matrix is represented by the formula (33).

[Numeral 33]

$$UB = VA \quad (33)$$

In order to solve the formula with respect to the matrix B, both sides of the formula (33) is multiplied from the left by a transposed matrix $U^T$ of the matrix U as shown by the formula (34).

[Numeral 34]

$$U^T UB = U_T VA \quad (34)$$

The matrix ($U^T$ U) is expanded to be the formula (35).

[Numeral 35]

$$U^T U = \begin{bmatrix} u_1 \\ u_2 \\ \vdots \\ u_{nk} \end{bmatrix} [u_1, u_2, \cdots u_{nk}]$$

$$= \begin{bmatrix} u_1 \cdot u_1 & u_1 \cdot u_2 & \cdots & u_1 \cdot u_{nk} \\ u_2 \cdot u_1 & u_2 \cdot u_2 & \cdots & u_2 \cdot u_{nk} \\ \vdots & \vdots & \vdots & \vdots \\ u_{nk} \cdot u_1 & u_{nk} \cdot u_2 & \cdots & u_{nk} \cdot u_{nk} \end{bmatrix} \quad (35)$$

In the formula (35), $<u_i \cdot u_j>$ means an inner product, and a square matrix which is a symmetrical to a diagonal element is obtained because $<u_i \cdot u_j>$ is equal to $<u_j \cdot u_i>$, and an inverse matrix exists because $<u_i>$ is different from $<u_j>$. Therefore, the inverse matrix $(U^T U)^{-1}$ of the matrix $(U^T U)$ is multiplied from the left of both sides of the formula to obtain the formula (36) and $\beta_k$ is calculated.

[Numeral 36]

$$(U^T U)^{-1} U^T UB = B = (U^T U)^{-1} U^T VA \quad (36)$$

As explained above, it is unnecessary by transforming the group of the orthonormal basis $\alpha_k <v_k>$ (k=1~m) to the non-orthonormal basis $\beta_k<u_k>$ (k=1~m) that each base extraction vector $<u_k>$ is subjected to orthogonal transform in decoding side every time, and the differential vector $<d_j>$ can approximate by adding a multiplied value of them and $\beta_k$. Thus, the decoding processing can be simply carried out at high speed.

A compression encoding processing of the expansion coefficient $\beta_k$ will be explained.

FIG. 13 is an image drawing of a compression encoding processing of the expansion coefficient. In FIG. 13(a), a norm is extracted from the produced $\beta_1$~$\beta_4$. In FIG. 13(b), a norm is arranged, for example, in ascending order ($\beta_3$, $\beta_2$, $\beta_4$, $\beta_1$) and a difference ($\Delta\beta_3$, $\Delta\beta_2$, $\Delta\beta_4$, $\Delta\beta_1$) is calculated. In FIG. 13(c), the upper bits are separated by removing the lowest two bits from all bits in the difference of coefficient ($\Delta\beta_3$, $\Delta\beta_2$, $\Delta\beta_4$, $\Delta\beta_1$) and are subjected to Hoffman encoding.

In the example, two groups of $\Delta\beta_3$ and ($\Delta\beta_2$, $\Delta\beta_4$, $\Delta\beta_1$) exist with respect to the value, and according to Huffman encoding, a code sign of less bit numbers is allotted to ($\Delta\beta_2$, $\Delta\beta_4$, $\Delta\beta_1$) of which generating frequency is more and a code sign of more bit numbers is allotted to $\Delta\beta_3$ of which generating frequency is less. Accordingly, the compression encoding of expansion coefficient $\beta_k$ is possible. Also, fractions of the lowest bits are omitted by Huffman encoding of the upper bits in difference $\Delta\beta_k$ of the coefficient, whereby possibility of $\Delta\beta_2=\Delta\beta_4=\Delta\beta_1$ is high in the upper bits as shown in FIG. 13(c).

The lowest two bits of difference $\Delta\beta_k$ is packed with positive and negative code sign bits and an index information (13 bits=0~8191) of the basis vectors $<u_k>$ corresponding to the sign bits in a code sign area of 2 bites fixed length and is output as the fixed length code sign. The output is carried out in the order of $\Delta\beta_3$, $\Delta\beta_2$, $\Delta\beta_4$ and $\Delta\beta_1$ (i.e. $u_3$, $u_2$, $u_4$, $u_1$).

In FIG. 13(d), each code sign is input in the order of $u_3$, $u_2$, $u_4$ and $u_1$ in decoding side, from which each of the coefficient $\Delta\beta_3$, $\Delta\beta_2$, $\Delta\beta_4$ and $\Delta\beta_1$ is separated. Further, $\beta_3$ is decoded from the first $\Delta\beta_3$, $\beta_2$ is decoded by adding $\Delta\beta_2$ to the decoded $\beta_3$, $\beta_4$ is decoded by adding $\Delta\beta_4$ to the decoded $\beta_2$, and then $\beta_1$ is decoded by adding $\Delta\beta_1$ to the decoded $\beta_4$. The decoding order is not important because $\beta_k\langle u_k\rangle$ is functioned based on the sum (linear bond) of these values.

The difference can be calculated by arranging the norm in descending order instead of the ascending order.

The coding processing by the encoding unit 34 will be explained. A prediction difference $\Delta_{DC_{I,J}}$ of DPCM is quantized by a quantization coefficient Q (Z), and only in case that $\Delta_{DC_{I,J}}$ is 0, run length coding is considered, and the prediction difference $\Delta_{DC_{I,J}}$ and the run length coding each is independently subjected to Huffman coding. Only in case that the basis number k is 0, the run length coding is considered, and the basis number k and the run length each is independently subjected to Huffman coding. The coefficient difference $\Delta\beta_k$ is quantized by a constant number Q (e.g. 8) to obtain its quotient, which is subjected to Huffman coding. The code signbits of the expansion coefficient $\beta_k$ and the lowest two bits of the coefficient difference $\Delta\beta_k$ are incorporated in the code information i (=13 bits) of the basis vector $\langle u_k\rangle$ to make the fixed length coding sign of 16 bits, which are incorporated in the coefficient difference $\Delta\beta_k$ in ascending (or descending) order and is transmitted. As a whole, row of the coding sign is constituted by incorporating these in appearing order per unit of pixel block. If necessary, a sign EOB is input to show change of pixel blocks.

Figure 2:
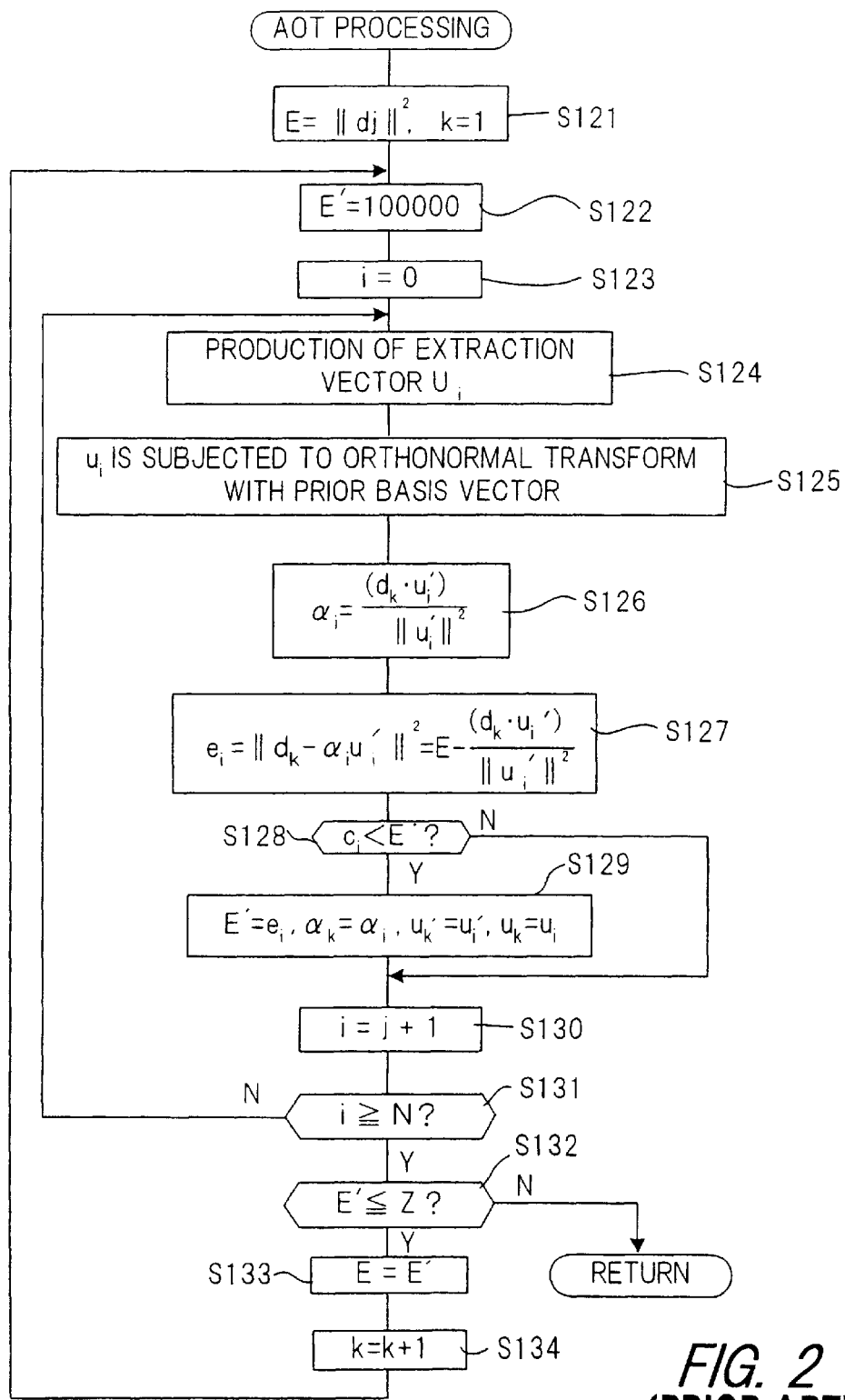
FIG. 2 is a flow chart of a conventional adaptive orthogonal transform processing.
Figure 3A:
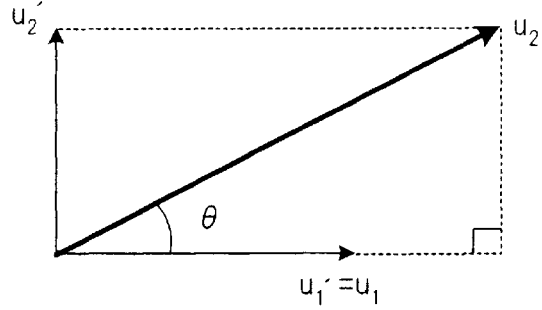
FIG. 3 is an image drawing of the conventional adaptive orthogonal transform processing.
Figure 3B:
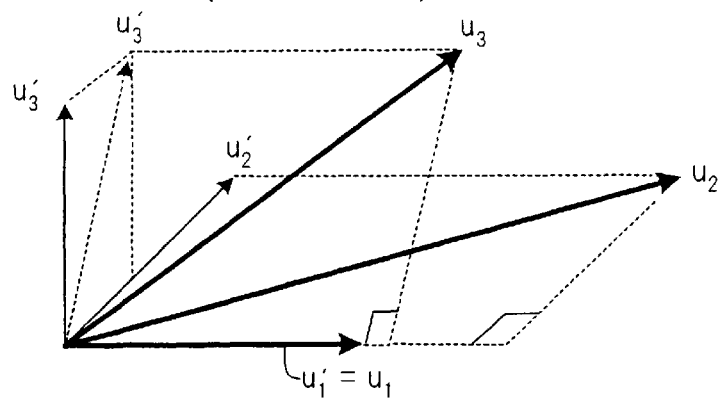
Figure 3C:
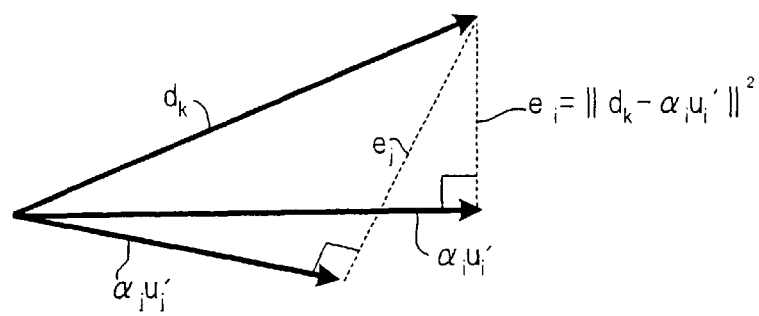
Figure 4A:
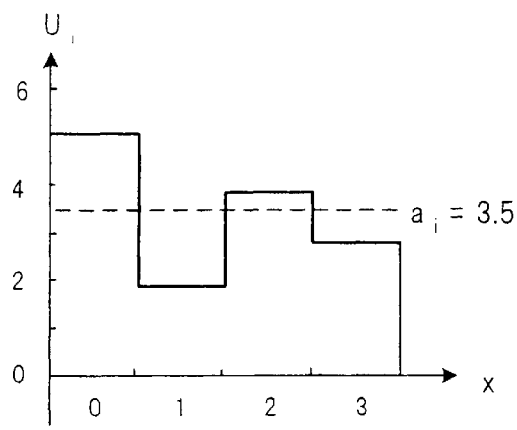
FIG. 4 is an image drawing of a conventional mean value separation processing.
Figure 4B:
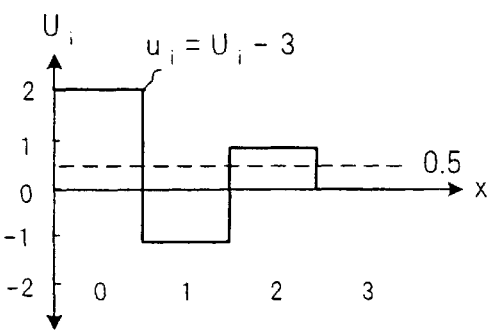
Figure 4C:
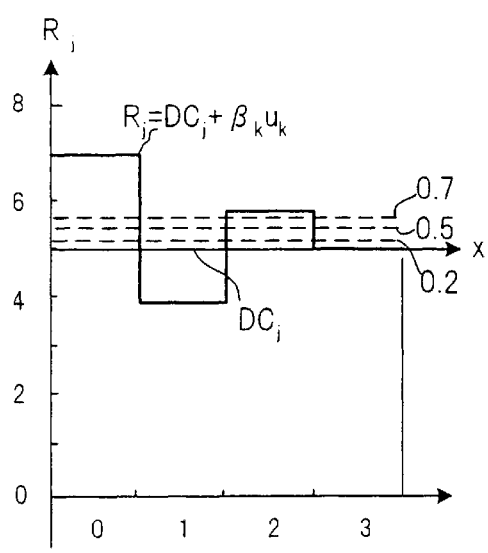
Figure 14:
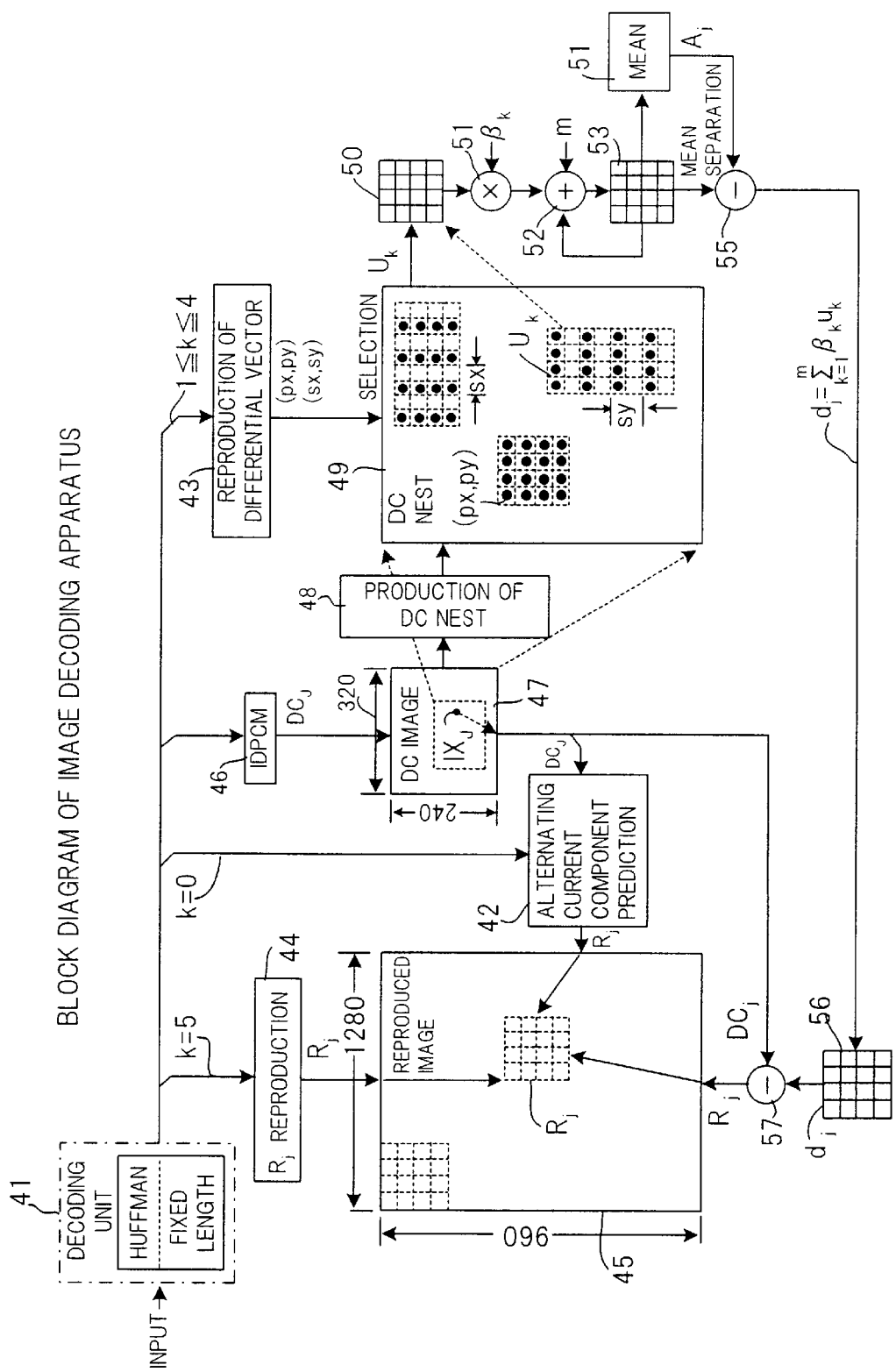
FIG. 14 is ablock diagram showing an image decoder, which is an embodiment of the invention.

FIG. 14 is a block diagram showing an image decoder, which is an embodiment of the invention, and corresponds to the image encoder as shown in FIG. 6. In FIG. 14, 41 is a decoding unit by Huffman, etc., 42 is an alternating current component prediction unit for predicting target blocks $\langle R_j\rangle$ containing the alternating current component from the surrounding DC values $DC_J'$ containing the noticeable pixels $DC_J$, 43 is the differential vector reproduction unit for reproducing an approximate differential vector $\langle d_j\rangle$ based on the decoding basis $\beta_k$ $\langle u_k\rangle$ (k=1~m), 44 is the $R_j$ reproduction unit for reproducing target blocks $\langle R_j\rangle$ based on the decoding blocks $\langle R_j\rangle$, 45 is the reproduced image memory, 46 is the IDPCM unit for IDPCM decoding the decoded DC value, 47 is the DC image memory for storing the DC nest, 48 is the DC nest production unit which is same as in FIG. 2, 49 is the DC nest memory for storing the DC nest, 50 is the selected block buffer for holing the selected blocks $\langle U_k\rangle$ which are down-sampled from the DC nest, 51 is a multiplier for multiplying $\langle U_k\rangle$ by $\beta_k$, 52 and 53 are the cumulative addition unit of $\beta_k\langle u_k\rangle$ (k=1~m), 54 is a means for obtaining a block mean value $A_j$ of cumulative addition values, 55 is a subtractor for separating the block mean value $A_j$ of cumulative addition values, 56 is an approximate vector buffer for holding reproduced approximate differential vector $\langle d_j\rangle$, and 57 is a means for adding the reproduced approximate differential vector $\langle d_j\rangle$.

Figure 15:
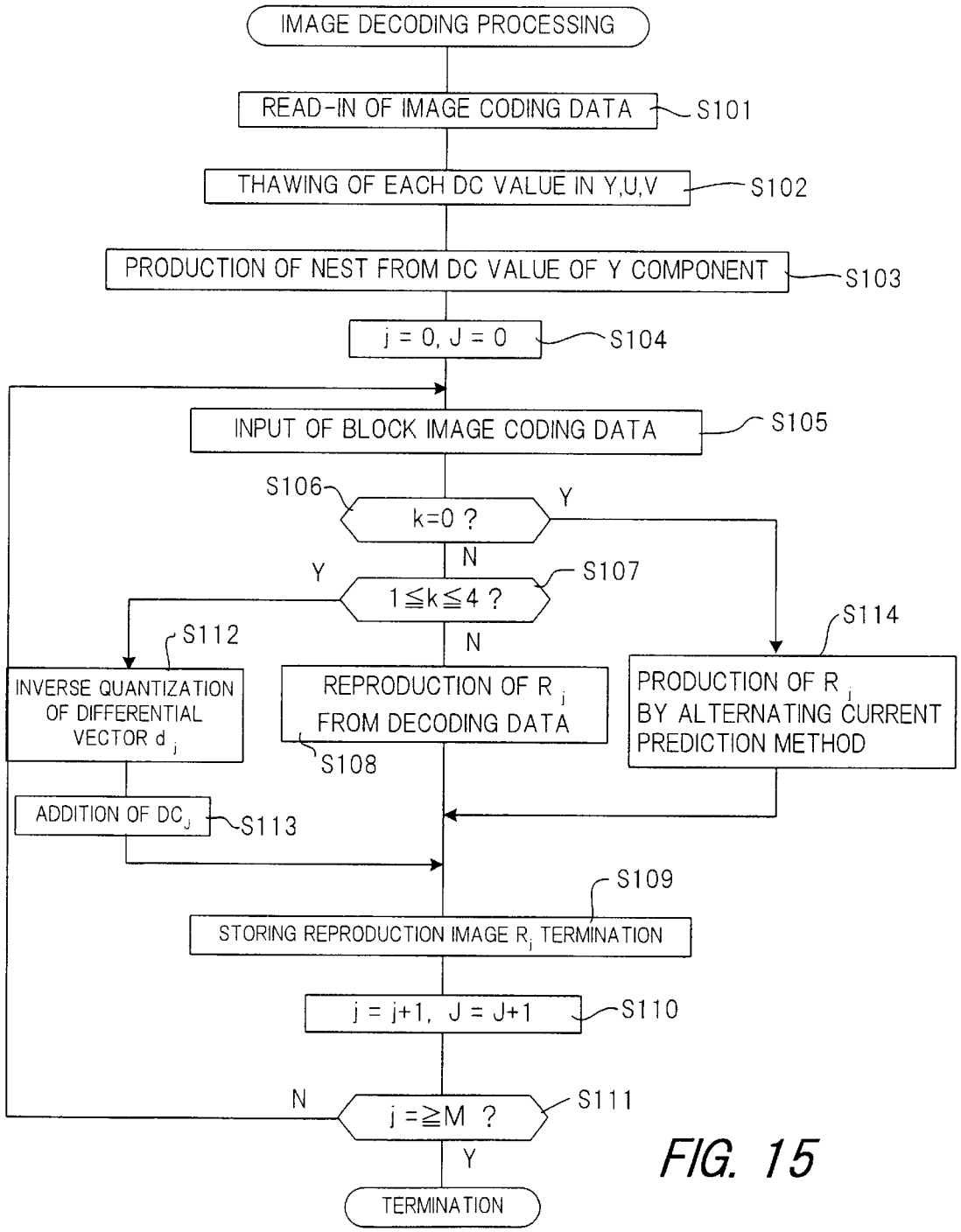
FIG. 15 is a flow chart showing an image decoding processing which is an embodiment of the invention.

In FIG. 15, which is a flow chart showing an image decoding processing of an embodiment of the invention, the image coding data is input at step S101. At step S102, each DC value in Y, U and V is decoded by IDPCM method similar to FIG. 6 and DC images are reproduced. At step S103, DC nest is produced from the DC value of Y component. At the time, as shown in FIG. 7, the lowest four bits of each DC pixel value $DC_J$ are masked to be each DC nest pixel value $N_J$. The information such as cut position of the DC images is separately received. At step S104, the index counters j and J to the original image memory 45 and DC image memory 47 are initialized to 0.

At step S105, coding data of one block image is input. At step S106, it is judged that k is 0 or not. In case that k is 0,
the target blocks $\langle R_j\rangle$ are reproduced by alternating current prediction method as described hereinafter. In case that k is not 0, it is judged at step S107 whether k is not less than 1 and not more than 4 or not.

In case k is not less than 1 and not more than 4, the differential vector $\langle d_j\rangle$ is inversely quantized at step S112. Since the lowest four bits of the DC nest are previously masked in the embodiment of the invention, the differential vector $\langle d_j\rangle$ is obtained at once by cumulatively adding the product of the selected block $\langle U_k\rangle$ and $\beta_k$ and by separating the block mean value $A_j$ from the cumulative addition result, whereby the decoding processing is carried out at high speed. At step S113, the DC value $DC_J$ corresponding to thus obtained differential vector $\langle d_j\rangle$ is added.

In case k is less than 1 and more than 4, the target blocks $\langle R_j\rangle$ are directly produced from the decoding data of the target blocks $\langle R_j\rangle$ at step S108. Thus, the target blocks $\langle R_j\rangle$ of 4 times 4 pixels are reproduced by any methods as above. The reproduced target blocks $\langle R_j\rangle$ are stored in the reproduced image memory 45 at step S109.

At step S110, "1" is added to the counters j and J, respectively, and at step S111, it is judged whether i is not less than M (all pixel block numbers) or not. In case that i is less than M, turning to step S105 and the decoding and reproducing processing is carried out with respect to subsequent the block image coding data. When the same procedure was proceeded and j is not less than M in the judge at step S111, the decoding processing per one image is terminated.

FIG. 16 is an image drawing of an alternating current component prediction, which is an embodiment of the invention and is applicable for conventional prediction methods.

Figure 16A:
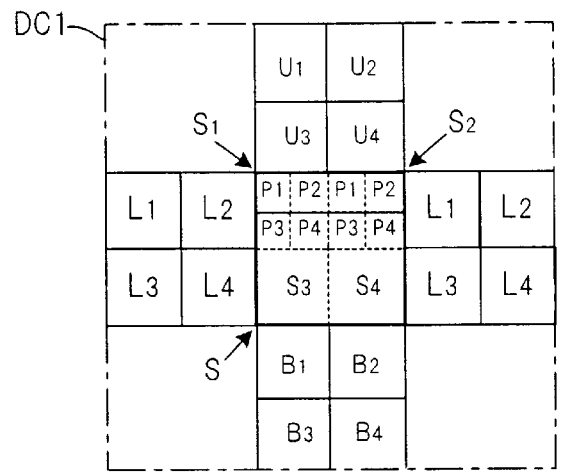
FIG. 16 is an image drawing of an alternating current component prediction, which is an embodiment of the invention.

FIG. 16(A) is a stepwise alternating current component prediction method as described hereinafter. At first stage, each sub-block $S_1$~$S_4$ is predicted from each DC value of the 4 blocks (U, R, B, L) surrounding the $S_1$~$S_4$.

$S_1=S+(U+L-B-R)/8$ $S_2=S+(U+R-B-L)/8$ $S_3=S+(B+L-U-R)/8$ $S_4=S+(B+R-U-L)/8$

Similarly, $U_1$~$U_4$, $L_1$~$L_4$, $R_1$~$R_4$ and $B_1$~$B_4$ are predicted at the first stage. At second stage, 4 pixels $P_1$~$P_4$ on $S_1$ are predicted by using the above method repeatedly.

$P_1=S_1+(U_3+L_2-S_3-S_2)/8$ $P_2=S_1+(U_3+S_2-S_3-L_2)/8$ $P_3=S_1+(S_3+L_2-U_3-S_2)/8$ $P_4=S_1+(S_3+S_2-U_3-L_2)/8$

Each 4 pixels $P_1$~$P_4$ on $S_2$~$S_4$ are predicted in the same manner. The target blocks $\langle R_j\rangle$ are reproduced by such two stage processing.

Figure 16B:
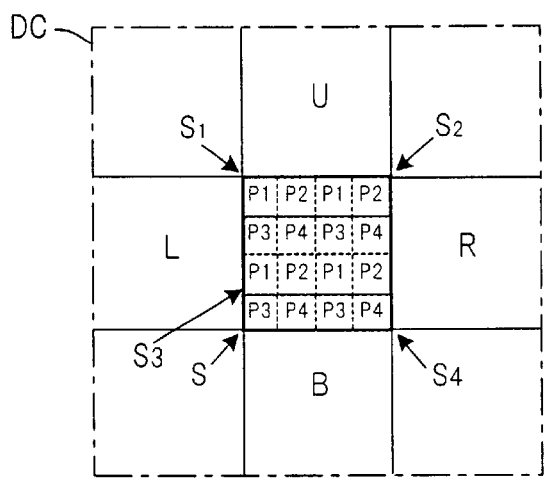

FIG. 16(B) is a non-stepwise alternating current component prediction method, which the applicant has been already proposed. In FIG. 16(B), each of the 4 pixels $P_1$~$P_4$ on each of the sub-block $S_1$~$S_4$ is predicted from each DC value of 4 blocks surrounding the noticeable block S at a stroke. At first, each approximation of $S_2\approx S_3\approx S$, $U_3\approx U_2$ and $L_2\approx L$ is carried out to obtain each 4 pixels $P_1$~$P_4$ on $S_1$. The approximation is applied to $P_1$~$P_4$ on $S_1$ to obtain the formula, $$P_1=S_1+(U_3+L_2-S_3-S_2)/8=S_1+(U+L-S-S)/8$$

The above formula, $S_1=S+(U+L-B-R)/8$, is substituted for the formula, $P_1=S_1+(U+L-S-S)/8$, $P_1$ on $S_1$ is finally represented by the formula, $P_1=S+(2U+2L-2S-B-R)/8$ And, $P_2$ on $S_1$ is represented by the formula, $P_2=S_1+(U_3+S_2=S_3-L_2)/8=S_1+(U+S-S-L)/8$ The above formula, $S_1=S+(U+L-B-R)/8$, is substituted for the formula, $P_2=S_1+(U+S-S-L)/8$, $P_2$ on $S_1$ is finally represented by the formula, $P_2=S+(2U-B-R)/8$ Also, $P_3$ on $S_1$ is represented by the formula, $P_3=S_1+(S_3+L_2-U_3-S_2)/8=S_1+(S+L-U-S)/8$ The above formula, $S_1=S+(U+L-B-R)/8$, is substituted for the formula, $P_3=S_1+(S+L-U-S)/8$, $P_3$ on $S_1$ is finally represented by the formula, $P_3=S+(2L-B-R)/8$ Further, $P_4$ on $S_1$ is represented by the formula, $P_4=S_1+(S_3+S_2-U_3-L_2)/8=S_1+(S+S-U-L)/8$ The above formula, $S_1=S+(U+L-B-R)/8$, is substituted for the formula, $P_4=S_1+(S+S-U-L)/8$, $P_4$ on $S_1$ is finally represented by the formula, $P_4=S+(2S-B-R)/8$ Accordingly, 4 pixels $P_1 \sim P_4$ on $S_1$ can be non-stepwise obtained by the formulae at a stroke.

$P_1=S+(2U+2L-2S-B-R)/8$ $P_2=S+(2U-B-R)/8$ $P_3=S+(2L-B-R)/8$ $P_4=S+(2S-B-R)/8$

Each 4 pixels $P_1 \sim P_4$ on $S_2 \sim S_4$ is obtained in the same manner.

The embodiments of the invention are explained by using the several examples, but it is apparent that the invention should not be limited thereto. It is to be appreciated that those skilled in the art can change or modify the embodiments in such point as construction, control, processing or a combination thereof without departing from the scope and spirit of the invention.

According to the invention, high image quality can be obtained by the improvement of the DC nest and high speed encoding can be achieved by the means for the AOT calculation. Therefore, the method of the invention much contributes to the attainment of high image quality and high speed encoding in the HVQ system.

What is claimed is:

1. In an image encoding method which comprises producing a DC image composed of each block mean value by dividing an image data per B pixel into a block, making a part of said DC image a DC nest, and where the differential vector which is obtained by separating the DC value from the pixel block to be encoded is over an allowable value, calculating one or more orthogonal basis, to which the differential vector is approximated, by the adaptive orthogonal transform using the DC nest, the improvement which comprises setting the lowest n ($n=\log_2 B$) bits of the DC pixels in each sample to 0, where the base extraction blocks are down-sampled from the DC nest and the block mean value thereof is calculated using the samples.

2. The method according to claim 1, wherein the lowest n bits of each DC pixels are set to 0, where the DC nest is produced from the DC image.

3. The method according to claim 2, wherein a base extraction vector is produced to which the differential vector approximates by separating the block mean value from the base extraction block in which n bits of the DC pixels are set to 0.

4. The method according to claim 3, optional elements of base extraction vectors $<u_i>$ are replaced by linear bond of the remainder elements and the inner product of the base extraction vectors and the other optional vectors $<w>$ are calculated by the formula, $<w \cdot u_i> = (w_1 - w_{16}) u_1 + (w_2 - w_{16}) u_2 + \ldots + (w_{15} - w_{16}) u_{15}.$ 5. The method according to claim 4, wherein a first basis is searched so that $h_i$ may be maximum in the following formula, $h_i = <d \cdot u_1>^2 / \|u_i\|^2$ wherein $<d>$ is the differential vectors and $<u_i>$ is the base extraction vectors.

6. The method according to claim 4, wherein a second basis is searched so that $h_i$ may be maximum in the following formula, $h_i = \{<d \cdot u_i> - (<d \cdot u_1><u_1 \cdot u_i>/\|u_1\|^2)^2/\{\|u_i\|^2 - (<u_1 \cdot u_i>)/\|u_1\|^2\}$ wherein $<d>$ is the differential vectors, $<u_1>$ is the base extraction vectors corresponding to the first basis, and $<u_i>$ is the base extraction vectors for searching the second basis.

7. The method according to claim 4, wherein a third basis is searched so that $h_i$ may be maximum in the following formula, $h_i = (<d \cdot u_i> - <d \cdot v_1><v_1 \cdot u_i> - <d \cdot v_2><v_2 \cdot i_i>)^2/\{\|u_i\|^2 - <v_1 \cdot u_i>^2 - <v_2 \cdot u_i>\}^2$ wherein $<d>$ is the differential vectors, $<v_1>$ is the first orthonormal base vectors, $<v_2>$ is the second orthonormal base vectors, and $<u_i>$ is the base extraction vectors for searching the third basis.

8. The method according to claim 6, wherein the base extraction vectors $<u_i>$ which match with search conditions are subjected to orthonormal transform with one or more preceding orthonormal basis.

9. In an image encoding apparatus which comprises producing a DC image composed of each block mean value by dividing an image data per B pixel into a block, making a part of said DC image a DC nest, and where a differential vector which is obtained by separating the DC value from the pixel block to be encoded is over an allowable value, calculating one or more orthogonal basis, to which the differential vector is approximated, by the adaptive orthogonal transform using the DC nest, the improvement comprising a memory to store the DC nest in which the lowest n ($n=\log_2 B$) bits of the DC nest pixels are set to 0.

10. A computer readable recording medium storing a program to make a computer to implement the processing comprising the processing recited in claims 1 to 8.

* * * * *